(12) United States Patent
Rekimoto et al.

(10) Patent No.: US 8,190,695 B2
(45) Date of Patent: May 29, 2012

(54) REMOTE CONTROL SYSTEM AND REMOTE CONTROL METHOD, DEVICE FOR PERFORMING REMOTE CONTROL OPERATION AND CONTROL METHOD THEREFOR, DEVICE OPERABLE BY REMOTE CONTROL OPERATION AND CONTROL METHOD THEREFOR, AND STORAGE MEDIUM

(75) Inventors: Junichi Rekimoto, Tokyo (JP); Yuji Ayatsuka, Tokyo (JP); Nobuyuki Matsushita, Kanagawa (JP); Haruo Oba, Kanagawa (JP)

(73) Assignee: Sony Corporation, Tokyo (JP)

( * ) Notice: Subject to any disclaimer, the term of this patent is extended or adjusted under 35 U.S.C. 154(b) by 1262 days.

(21) Appl. No.: 10/485,192

(22) PCT Filed: Aug. 1, 2002

(86) PCT No.: PCT/JP02/07840
§ 371 (c)(1),
(2), (4) Date: Jan. 26, 2005

(87) PCT Pub. No.: WO03/015451
PCT Pub. Date: Feb. 20, 2003

(65) Prior Publication Data
US 2005/0120096 A1    Jun. 2, 2005

(30) Foreign Application Priority Data

Aug. 2, 2001 (JP) ................................. 2001-234980
Feb. 18, 2002 (JP) ................................. 2002-040737

(51) Int. Cl.
*G06F 15/173* (2006.01)

(52) U.S. Cl. ......... 709/208; 709/213; 709/228; 455/420
(58) Field of Classification Search .................. 709/213, 709/208, 228; 455/420
See application file for complete search history.

(56) References Cited

U.S. PATENT DOCUMENTS

| 5,201,067 A | 4/1993 | Grube et al. |
| 5,959,539 A | 9/1999 | Adolph et al. |
| 6,133,847 A | 10/2000 | Yang |

(Continued)

FOREIGN PATENT DOCUMENTS

JP    2000-217167    8/2000

(Continued)

OTHER PUBLICATIONS

Extended European Search Report of counterpart Application No. 11160334.6, dated Dec. 13, 2011 (6 pages).

*Primary Examiner* — Kevin Bates
(74) *Attorney, Agent, or Firm* — Finnegan, Henderson, Farabow, Garrett & Dunner, L.L.P.

(57) ABSTRACT

A portable information terminal is placed in proximity with an ID recognition unit of a notebook PC. By reading ID from the portable information terminal, the notebook PC is able to identify a network address of the portable information terminal so as to establish a network connection with the portable information terminal. The notebook PC then sends suitable operation information to the portable information terminal via a network. For example, if presentation is running on the notebook PC, screen information for operating the presentation is transferred to the portable information terminal. Accordingly, by using one device connected to the other device by a wired or wireless network, the operation of the other device can be controlled.

31 Claims, 23 Drawing Sheets

U.S. PATENT DOCUMENTS

| | | | |
|---|---|---|---|
| 6,507,761 B1 * | 1/2003 | Keegan | 700/21 |
| 6,622,018 B1 * | 9/2003 | Erekson | 455/420 |
| 7,072,945 B1 * | 7/2006 | Nieminen et al. | 709/217 |
| 7,237,029 B2 * | 6/2007 | Hino et al. | 709/227 |

FOREIGN PATENT DOCUMENTS

| | | |
|---|---|---|
| JP | 2001-100972 | 4/2001 |
| JP | 2001-142825 | 5/2001 |
| JP | 2002-525739 | 8/2002 |
| WO | WO 92/20167 | 11/1992 |
| WO | WO 00/02344 | 1/2000 |
| WO | WO 00/17738 | 3/2000 |
| WO | WO 01/20572 | 3/2001 |
| WO | WO 01/20572 A1 | 3/2001 |

* cited by examiner 1-4 DEVICE OPERATING ENVIRONMENT

REMOTE CONTROL SYSTEM AND REMOTE CONTROL METHOD, DEVICE FOR PERFORMING REMOTE CONTROL OPERATION AND CONTROL METHOD THEREFOR, DEVICE OPERABLE BY REMOTE CONTROL OPERATION AND CONTROL METHOD THEREFOR, AND STORAGE MEDIUM

TECHNICAL FIELD

The present invention relates to a remote control system and a remote control method, a device for performing a remote control operation and a control method therefore, a device operable by remote control operation and a control method therefore, and a storage medium that allow one device to control the operation of another device. More particularly, the invention relates to a remote control system and a remote control method, a device for performing a remote control operation and a control method therefore, a device operable by remote control operation and a control method therefore, and a storage medium in which one device can perform a remote control operation on another device under a suitable operating environment.

More specifically, the invention pertains to a remote control system and a remote control method, a device for performing a remote control operation and a control method therefore, a device operable by remote control operation and a control method therefore, and a storage medium in which a remote control operation can be performed under a suitable operating environment constructed by using operation information for allowing one device to perform a remote control operation on another device. More particularly, the invention relates to a remote control system and a remote control method, a device for performing a remote control operation and a control method therefore, a device operable by remote control operation and a control method therefore, and a storage medium in which a remote control operation can be performed under a suitable operating environment by allowing one device to dynamically obtain operation information concerning another device.

BACKGROUND ART

As a result of recent technological innovation, various information devices, for example, workstations (WSs) and general computers such as personal computers (PCs), are being developed and widely used.

Generally, information devices are configured such that the user is able to perform operations, for example, command input, by using a keyboard or a mouse or by various operation buttons, which are provided for the information devices as standard features.

Small and light information terminals, for example, cellular telephones and PDAs (Personal Digital Assistants), are also coming into widespread use. Accordingly, there is an increasing demand for exchanging data between such information terminals. For example, the user wishes to operate information devices installed in offices or households (for example, fixed computers, such as desk-top computers, other types of relatively large information devices, and information household electrical appliances), by using a cellular telephone or a PDA which is always carried by the user and is familiar to the user.

Generally, for implementing data exchange between devices, the devices are connected to each other by using cables.

However, wired connection makes the operation troublesome and complicated for the user, and is also impractical because the user has to prepare a connector compatible with each device to be communicated with.

Additionally, in infrared data communication, for example, IrDA (Infrared Data Association), the viewing angle used in the infrared transmitter is narrow. Accordingly, data communication is easily interrupted due to the presence of an obstacle, for example, by the user inadvertently passing through the infrared transmission channel.

Recently, it has been suggested that a plurality of devices be wirelessly connected by using a technique such as a wireless LAN (Local Area Network), for example, IEEE802b.11, or short-distance wireless data communication such as Bluetooth® communication. Since radio communication is non-directional, the problem of interrupting transmission data due to an obstacle is not presented.

When communication is performed via a wired or wireless network, however, the user must input the address (or address information corresponding to the address) of a communicating device. Normally, since the user cannot memorize the address of each device, he/she prepares an address book in advance and manually inputs the address while referring to it. Accordingly, the operability of current wireless connection between devices is low and is impractical. For example, even when connecting a cellular telephone or a PDA owned by the user to a computer or another information device installed in front of the user, he/she must input the address of the communicating device.

Additionally, it is now assumed that the user wirelessly connects a cellular telephone or a PDA owned by the user to an information device installed in an office or a household, and then remotely controls the information device by using the cellular telephone or PDA, whose operation is familiar to the user. In this case, such a cellular telephone or PDA is not provided with an operating environment compatible with the information device. It would be convenient if a cellular telephone were provided with operation information, such as a GUI (Graphical User Interface) specially used for the operations of household electrical appliances, for example, televisions or audio devices. It is not practical, however, that the operation information of each device is included in a cellular telephone as a standard feature. That is, when operating another device via a portable terminal, the usability of the current system is low.

DISCLOSURE OF INVENTION

Accordingly, it is an object of the present invention to provide a remote control system and a remote control method, a device for performing a remote control operation and a control method therefore, a device operable by remote control operation and a control method therefore, and a storage medium that exhibit excellent characteristics by allowing one device to control the operation of another device under a suitable operating environment.

It is another object of the present invention to provide a remote control system and a remote control method, a device for performing a remote control operation and a control method therefore, a device operable by remote control operation and a control method therefore, and a storage medium that exhibit excellent characteristics by performing a remote control operation under a suitable operating environment constructed by using operation information for allowing one device to perform a remote control operation on another device.

It is still another object of the present invention to provide a remote control system and a remote control method, a device for performing a remote control operation and a control method therefore, a device operable by remote control operation and a control method therefore, and a storage medium, that exhibit excellent characteristics by performing a remote control operation under a suitable operating environment by allowing one device to dynamically obtain operation information concerning another device.

The present invention has been made in view of the above-described objects. A first aspect of the present invention provides a remote control system that allows a first device to control an operation of a second device, including:

ID information indicating an access method for exchanging information;

an ID recognition unit for identifying the access method by reading the ID information;

network connection means for establishing a network connection between the devices;

operation information providing means for providing operation information for remotely controlling the second device to the first device according to the access method identified by the ID recognition unit; and remote control means for allowing the first device to remotely control the second device by using the operation information.

The "system" described above is a logical set of a plurality of devices (or functional modules implementing predetermined functions), and it is not essential that the devices or functional modules be in the same housing.

A second aspect of the present invention provides a remote control method that allows a first device to control an operation of a second device, including:

an ID recognition step of identifying an access method for exchanging information by reading ID information indicating the access method;

a network connection step of establishing a network connection between the devices;

an operation information providing step of providing operation information for remotely controlling the second device to the first device according to the access method identified by the ID recognition step; and a remote control step of allowing the first device to remotely control the second device by using the operation information.

In the remote control system according to the first aspect of the present invention or the remote control method according to the second aspect of the present invention, the first device may be a small portable information terminal, such as a cellular telephone or a PDA, owned by a user, and the second device may be a fixed information device, such as a notebook computer, a desk-top computer, or a liquid crystal projector, an information household electrical appliance, such as a television receiver or another AV equipment. Then, by using the portable information terminal whose operation is familiar to the user, the user remotely controls the fixed information device or information household electrical appliance.

That is, in the remote control system according to the first aspect of the present invention or the remote control method according to the second aspect of the present invention, when, for example, the portable information terminal is placed in proximity with the ID recognition unit of the notebook computer, the notebook computer is able to identify the access method, for example, a network address of the portable information terminal, by reading the ID information from the portable information terminal by using the ID recognition unit. Then, the notebook computer establishes a network connection with the portable information terminal.

The notebook computer also sends operation information suitable for the processing state of the notebook computer to the portable information terminal via a network. The operation information may be user interface information indicating an operation screen or an operation method suitable for operating the second device by the first device, and provides a GUI (Graphical User Interface) environment specifically used for operating the device.

For example, if presentation is running, screen information for operating the presentation is transferred to the portable information terminal as the operation information. As a result, the user is able to suitably control remotely the presentation being worked on the notebook computer by using the user interface prepared on the portable information terminal.

The ID information may be a network address of the first device. In this case, the ID recognition unit or step reads the ID information so as to obtain the network address for accessing the first device. Then, the operation information providing means or step transfers the operation information for remotely controlling the second device to the first device by using the obtained network address.

Alternatively, the ID information may be a network address of the second device. In this case, the ID recognition unit or step reads the ID information so as to obtain the network address for accessing the second device. Then, the operation information providing means or step supplies the operation information for remotely controlling the second device in response to an access request made by using the obtained network address.

The ID information may be possessed by the first device, and the ID recognition unit may be provided for the second device. In this case, by reading the ID information by using the ID recognition unit, the second device is able to obtain the method for accessing the first device.

Alternatively, the ID information may be possessed by the second device, and the ID recognition unit may be provided for the first device. In this case, by reading the ID information by using the ID recognition unit, the first device is able to obtain the method for accessing the second device.

The ID information may be a method for accessing an information storage location, for example, a URL (Uniform Resource Locator), specially provided for the first device. In this case, the ID recognition unit or step obtains the method for accessing the information storage location by reading the ID information. Then, the operation information providing means or step provides the operation information for remotely controlling the second device via the information storage location by using the obtained method.

For example, the operation information providing means or step may upload the operation information onto the information storage location designated by the URL. Alternatively, the operation information providing means or step may write a method for accessing the storage location of the operation information into the information storage location designated by the URL. In the second case, the operation information providing means or step may request a server for storing the information to redirect the location. As a result, the first device is able to obtain the operation information for remotely controlling the second device by accessing the information storage location specially provided for the first device. Redirect is a download procedure for rewriting a resource identifier, for example, a URL, in a server and for returning a target URL.

For example, the ID information or the ID recognition unit may be installed in a place which is associated with a function implemented by the second device to be remotely controlled by the first device. For example, when the second device to be remotely controlled is a liquid crystal projector, the ID information of the liquid crystal projector may be provided on a projection screen on which drawing content is projected. Alternatively, when the second device to be remotely controlled is a television receiver installed in a living room, the ID information of the television receiver may be disposed on a table in the same living room. With this arrangement, the ID information can be disposed within a range in which the ID recognition unit can read the ID information regardless of where the second device to be remotely controlled is installed, thereby making it possible to reliably distribute the operation information.

Alternatively, the ID information or the ID recognition unit may be provided in a peripheral device connected to the second device to be remotely controlled by the first device. For example, if the second device to be remotely controlled by the first device is a desk-top computer, the ID information may be disposed on a user input/output device, for example, a mouse, a keyboard, or a display, locally connected to the computer. With this arrangement, the ID information can be disposed within a range in which the ID recognition unit can read the ID information regardless of where the second device to be remotely controlled is disposed, thereby making it possible to reliably distribute the operation information.

The ID recognition unit may read the ID information according to any one of formats including an RF-ID, touch net, a barcode, a two-dimensional barcode, a cybercode, and infrared communication.

A network for connecting the devices may be formed by, for example, one of a wireless or wired LAN (Local Area Network), Bluetooth communication, a telephone network, and the Internet, or a combination thereof.

A third aspect of the present invention provides a device for remotely controlling a first device or a control method therefore, including:

ID information indicating an access method for exchanging information or a step for allowing the second device to read ID information;

network connection means for or a network connection step of establishing a network connection;

operation information obtaining means for or an operation information obtaining step of obtaining operation information for remotely controlling the first device by using the access method; and remote control means for or a remote control step of remotely controlling the first device via a network by using the obtained operation information.

A fourth aspect of the present invention provides a device for remotely controlling a first device or a control method therefore, including:

ID recognition means for or an ID recognition step of reading ID information indicating an access method for exchanging information;

network connection means for or a network connection step of establishing a network connection;

operation information obtaining means for or an operation information obtaining step of obtaining operation information for remotely controlling the first device by using the access method read by the ID recognition means or step; and remote control means for or a remote control step of remotely controlling the first device via a network by using the obtained operation information.

The operation information may be user interface information indicating an operation screen or an operation method suitable for operating the first device by the device, and provides a GUI (Graphical User Interface) environment specially used for operating the device.

The device for performing a remote control operation or the control method therefore according to the third or the fourth aspect of the present invention corresponds to a portable information terminal, such as a cellular telephone or a PDA (Personal Digital Assistant), owned by a user, and can be used for a remote control operation on another information device, for example, a computer or a liquid crystal projector, or another information household electrical appliance, for example, a television receiver or AV equipment.

The ID information may be a network address of the device. In this case, the operation information obtaining means or step receives the operation information, sent to the network address, for remotely controlling the first device.

Alternatively, the ID information may be a network address of the first device. In this case, the operation information obtaining means or step obtains the operation information for remotely controlling the first device by using the network address read by the ID recognition means or step.

The ID information may be provided in a place which is associated with a function implemented by the first device to be remotely controlled or may be provided in a peripheral device connected to the first device to be remotely controlled.

The ID information may be a method for accessing an information storage location specially provided for the device. In this case, by distributing the access method to the first device, the first device is able to access the information storage location. By allowing the operation information for remotely controlling the first device or a method for accessing this operation information to be written into the information storage location, the operation information obtaining means or step can obtain the operation information.

For example, the first device may upload the operation information onto the information storage location designated by a URL, or may write the method for accessing the storage location of the operation information into the information storage location designated by the URL. In the second case, the first device may request a server for storing the information to redirect the storage location. As a result, the device is able to obtain the operation information for remotely controlling the first device by accessing the information storage location specially provided for the device.

The ID information may be represented by any one of formats including an RF-ID, touch net, a barcode, a two-dimensional barcode, a cybercode, and infrared communication.

A fifth aspect of the present invention provides a device for being remotely controlled by a first device or a control method therefore, including:

ID recognition means for or an ID recognition step of reading ID information indicating an access method for exchanging information;

network connection means for or a network connection step of establishing a network connection;

operation information providing means for or an operation information providing step of providing operation information for remotely controlling the device to the first device by using the access method read by the ID recognition means or step; and operation means for or an operation step of being operated by being remotely controlled by the first device.

A sixth aspect of the present invention provides a device for being remotely controlled by a first device or a control method therefore, including:

ID information indicating an access method for exchanging information or a step for allowing the first device to read ID information;

network connection means for or a network connection step of establishing a network connection;

operation information providing means for or an operation information providing step of providing operation information for remotely controlling the device to the first device; and operation means for or an operation step of being operated by being remotely controlled by the first device.

The operation information may be user interface information indicating an operation screen or an operation method suitable for operating the device by the first device, and provides a GUI (Graphical User Interface) environment specially used for operating the device.

The first device may be a portable information terminal, such as a cellular telephone or a PDA (Personal Digital Assistant), owned by a user.

The device may be a relatively large device used in an environment in which the device is installed, such as a notebook computer, a desk-top computer, a liquid crystal projector, or a television receiver.

The ID information may be a network address of the first device. In this case, the operation information providing means or step sends the operation information for remotely controlling the device to the network address.

Alternatively, the ID information may be a network address of the device. In this case, the operation information providing means or step sends the operation information for remotely controlling the device in response to an access request made to the network address.

The ID information may be provided in a place which is associated with a function implemented by the device, or may be provided in a peripheral device connected to the device.

The ID information may be a method for accessing an information storage location specially provided for the first device for remotely controlling the device. In this case, access can be made to this information storage location according to the access method read by identifying the ID. The operation information providing means or step can provide the operation information to the first device by writing the operation information for remotely controlling the device or a method for accessing this operation information.

The ID information may be represented by any one of formats including an RF-ID, touch net, a barcode, a two-dimensional barcode, a cybercode, and infrared communication.

A seventh aspect of the present invention provides a storage medium in which computer software for allowing a device for remotely controlling a first device to be controlled in a computer system is physically stored in a computer readable format. The computer software including:

a step of allowing the first device to read ID information indicating an access method for exchanging information;

a network connection step of establishing a network connection;

an operation information obtaining step of obtaining operation information for remotely controlling the first device by using the access method; and a remote control step of remotely controlling the first device via a network by using the obtained operation information.

An eighth aspect of the present invention provides a storage medium in which computer software for allowing a device for remotely controlling a first device to be controlled in a computer system is physically stored in a computer readable format. The computer software includes:

an ID recognition step of reading ID information indicating an access method for exchanging information;

a network connection step of establishing a network connection;

an operation information obtaining step of obtaining operation information for remotely controlling the first device by using the access method read by the ID recognition step; and a remote control step of remotely controlling the first device via a network by using the obtained operation information.

A ninth aspect of the present invention provides a storage medium in which computer software for allowing a device for being remotely controlled by a first device to be controlled in a computer system is physically stored in a computer readable format. The computer software includes:

an ID recognition step of reading ID information indicating an access method for exchanging information;

a network connection step of establishing a network connection;

an operation information providing step of providing operation information for remotely controlling the device to the first device by using the access method read by the ID recognition step; and an operation step of being operated by being remotely controlled by the first device.

A tenth aspect of the present invention provides a storage medium in which computer software for allowing a device for being remotely controlled by a first device to be controlled in a computer system is physically stored in a computer readable format. The computer software includes:

a step of allowing the first device to read ID information indicating an access method for exchanging information;

a network connection step of establishing a network connection;

an operation information providing step of providing operation information for remotely controlling the device to the first device; and an operation step of being operated by being remotely controlled by the first device.

The storage media according to the seventh through tenth aspects of the present invention are media for providing in a computer readable format computer software to a general-purpose computer system that can execute various program codes. Such media are portable media that can be attached and detached, for example, DVD (Digital Versatile Disc), CD (Compact Disc), FD (Flexible Disk), and MO (Magneto-Optical disc).

The storage media according to the seventh through tenth aspects of the present invention define the structurally or functionally co-operational relationship between computer software and the storage media so as to implement predetermined functions of the computer software in the computer system. In other words, by installing the predetermined computer software into the computer system via the storage medium according to one of the seventh through tenth aspects of the present invention, the co-operational action can be exerted in the computer system, thereby making it possible to obtain operations and advantages similar to those achieved by the device for performing a remote control operation and the control method therefore according to the third and fourth aspects of the present invention or by the device for being operated by remote control operation and a control method therefore according to the fifth and sixth aspects of the present invention.

Further objects, features and advantages of the present invention will become apparent from the following detailed description of the preferred embodiments of the present invention with reference to the attached drawings.

BEST MODE FOR CARRYING OUT THE INVENTION

An embodiment of the present invention is described in detail below with reference to the drawings.

Figure 1:
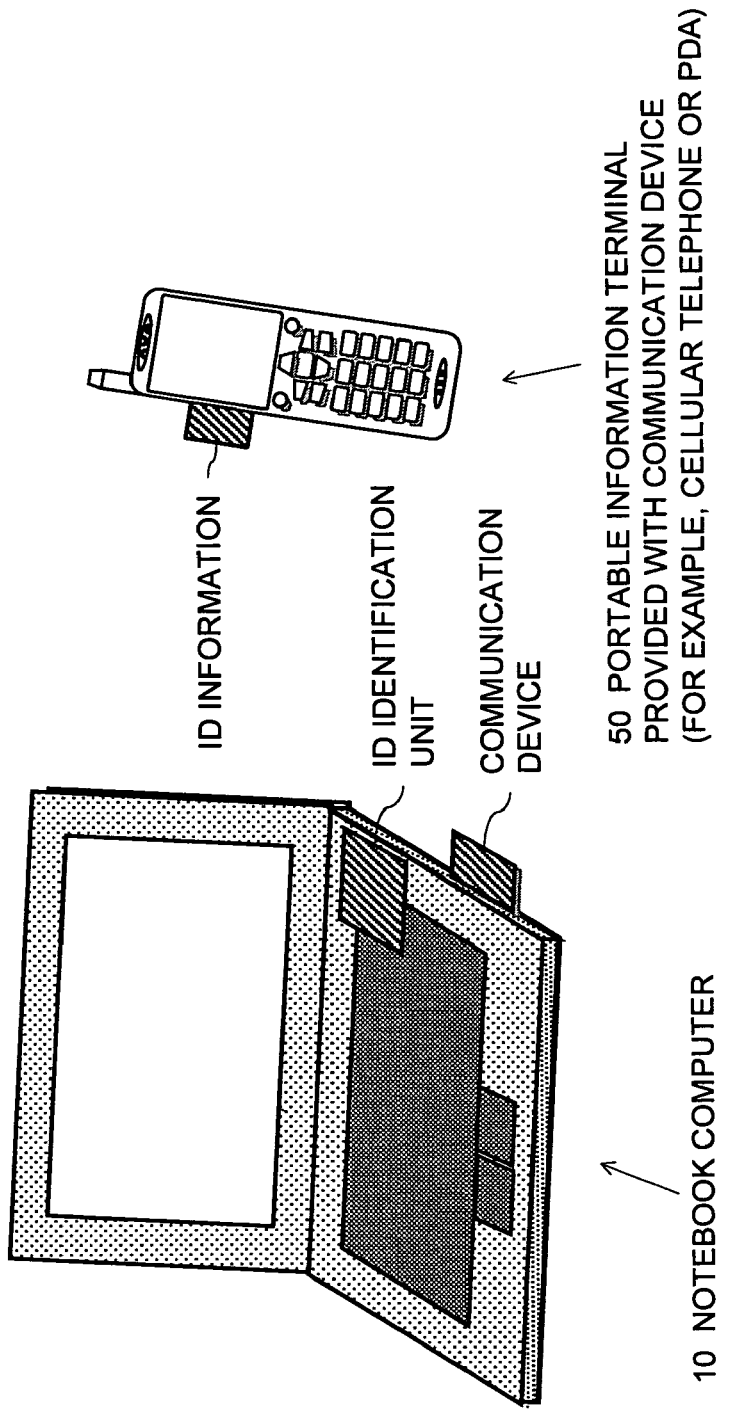
FIG. 1 illustrates a device operating environment to which the present invention is applied.

FIG. 1 illustrates a device operating environment 1 to which the present invention is applied. As shown in FIG. 1, in the device operating environment 1, an information processing device 10, for example, a notebook computer, used by the user, and a small portable information terminal 50, for example, a cellular telephone or a PDA (Personal Digital Assistant), owned by the user are provided.

In the example shown in FIG. 1, the portable information terminal 50 is provided with a communication device connected to a network, such as a cellular telephone network, a wireless LAN (Local Area Network), for example, IEEE802.11b, or short-distance wireless data communication, for example, Bluetooth communication, and also possesses ID information. In this embodiment, the ID information possessed by the portable information terminal 50 indicates the method for accessing the portable information terminal 50 itself. As the access method, a network address, for example, an IP address, resource ID information, for example, a URL (Uniform Resource Locator) or URI (Uniform Resource Identifier), a telephone number, and other ID numbers can be used. The portable information terminal 50 is provided with a user interface, for example, a screen, operation buttons, and input keys for operating the terminal.

The notebook computer 10 also includes a communication device connected to a network, for example, a telephone network, a wireless LAN (Local Area Network), for example, IEEE802b.11b, or short-distance wireless data communication, for example, Bluetooth communication, and also includes an ID recognition unit for reading ID information from the portable information terminal 50.

By reading the ID information from the portable information terminal 50 by using the ID recognition unit, the notebook computer 10 is able to obtain the method for accessing the portable information terminal 50, for example, the network address. The ID recognition unit may be attached to the portable information terminal 50 rather than to the notebook computer 10, in which case, the portable information terminal 50 reads the ID information of the notebook computer 10, i.e., the network address.

In the device operating environment 1 shown in FIG. 1, the user places the portable information terminal 50 in proximity with the ID recognition unit of the notebook computer 10. By reading the ID information from the portable information terminal 50 by using the ID recognition unit, the notebook computer 10 is able to obtain the method for accessing the portable information terminal 50, such as the network address. By using this network address, the notebook computer 10 establishes a network connection with the portable information terminal 50 so that they can communicate with each other.

The notebook computer 10 also sends operation information suitable for the processing state of the notebook computer 10 to the portable information terminal 50 via a network. This operation information includes user interface information, for example, an operation screen (GUI: Graphical User Interface) suitable for operating the notebook computer 10 by the portable information terminal 50, and other items of information, for example, the operation method.

If, for example, presentation software is running on the notebook computer 10, screen information (described below) for operating the presentation by using the display screen of the portable information terminal 50 is transferred to the portable information terminal 50 as the operation information via a network. As a result, the user is able to remotely control the presentation being worked on the notebook computer 10 by using the operation screen and the operation buttons of the portable information terminal 50.

Figure 2:
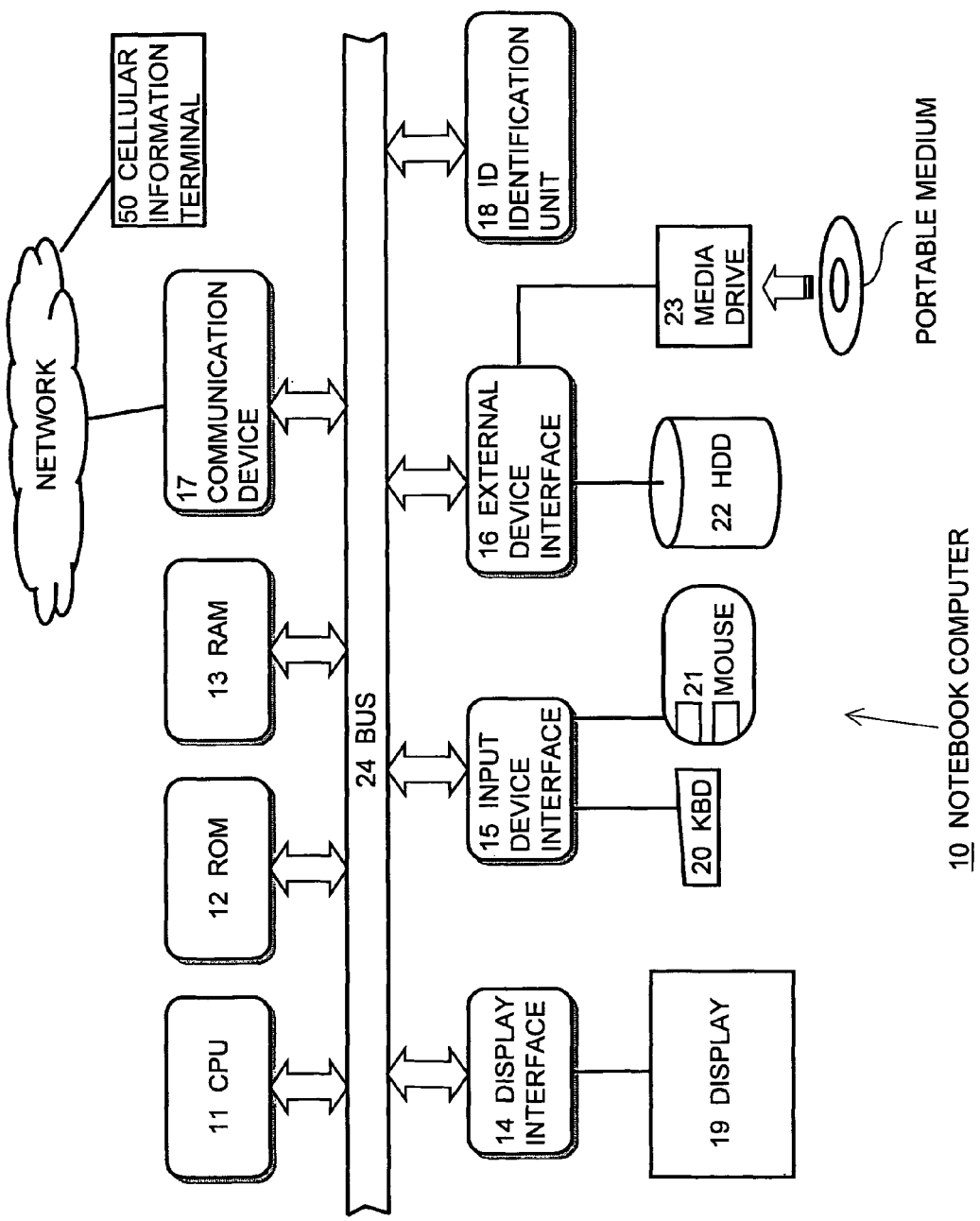
FIG. 2 schematically illustrates the hardware configuration of a notebook computer 10 used in this embodiment.

FIG. 2 schematically illustrates the hardware configuration of the notebook computer 10 used in this embodiment.

A CPU (Central Processing Unit) 11, which serves as the main controller, executes various applications under the control of an operating system (OS). As shown in FIG. 2, the CPU 11 is interconnected to other devices (described below) via a system bus 24.

A ROM (Read Only Memory) 12 is a read only memory used for permanently storing a self-diagnostic program (POST) executed when the system 10 is started, or a code group for performing input/output operations (BIOS). A RAM 13 is a random access memory used for storing program code executed by the CPU 11 or for temporarily storing running work data.

A display interface 14 is a display-output-dedicated interface controller for processing drawing commands issued by the CPU 11. Drawing data processed by the display controller 14 is temporarily written into, for example, a frame buffer (not shown), and is then output to a display 19.

An input device interface 15 is a device for connecting a user input device, for example, a keyboard 20 or a mouse 21, to the system 10.

A communication device 17, which is a network interface card (NIC), a modem, or a Bluetooth controller, connects the system 10 to a local network, for example, a LAN (Local Area Network), a public telephone network, or a wide area network, for example, the Internet. A plurality of host devices are present on the network, and the system 10 is able to access the host devices according to a predetermined access method. As the access method, an IP address or other types of network addresses, a URL (Uniform Resource Locator)/URI (Uniform Resource Identifier), a telephone number, and other ID numbers can be used. One of the host devices is the portable information terminal 50.

Software programs or data content can be distributed on the network. For example, an application program for performing a network connection, an application program for providing operation information, and an application program for performing a remote control operation by using a portable information terminal can be downloaded via the network.

An external device interface 16 is a device for connecting external devices, for example, a hard disk drive (HDD) 22 and a media drive 23, to the system 10.

The HDD 22 is a known external storage device having a built-in magnetic disk as a storage carrier, and is excellent over other external storage devices in terms of the storage capacity, the data transfer rate, etc. Placing software programs on the HDD 22 in an executable manner is referred to as "installing" the programs on the system 10. Generally, in the HDD 22, the program code of the operating system to be run by the CPU 11, application programs, device drivers, etc. are stored in a non-volatile manner. An application program for performing a network connection, an application program for providing operation information, and an application program for performing a remote control operation by using a portable information terminal can be installed on the HDD 22.

The media driver 23 is a device for loading portable media, for example, a CD (Compact Disc), a MO (Magneto-Optical disc), or a DVD (Digital Versatile Disc), so as to access the data recording surface of the portable medium.

Portable media are mainly used for saving software programs or data files as backup data in a computer-readable format, or for transferring (including selling and distributing) such data between systems. An application program for performing a network connection, an application program for providing operation information, and an application program for performing a remote control operation by using a portable information terminal can be physically distributed between a plurality of devices by using such portable media.

An ID recognition unit 18 is a device for reading ID information stored in an external device, for example, the portable information terminal 50. The ID recognition method is not particularly restricted, and any method can be used as long as one device is able to read ID information of the other device without the need to establish a connection on the network.

An example of the computer 10, such as that in FIG. 2, is a "PC/AT (Personal Computer/Advanced Technology)"-type IBM-compatible personal computer or a succeeding machine. Of course, a computer provided with another architecture can be used as the computer 10 of this embodiment.

Figure 3:
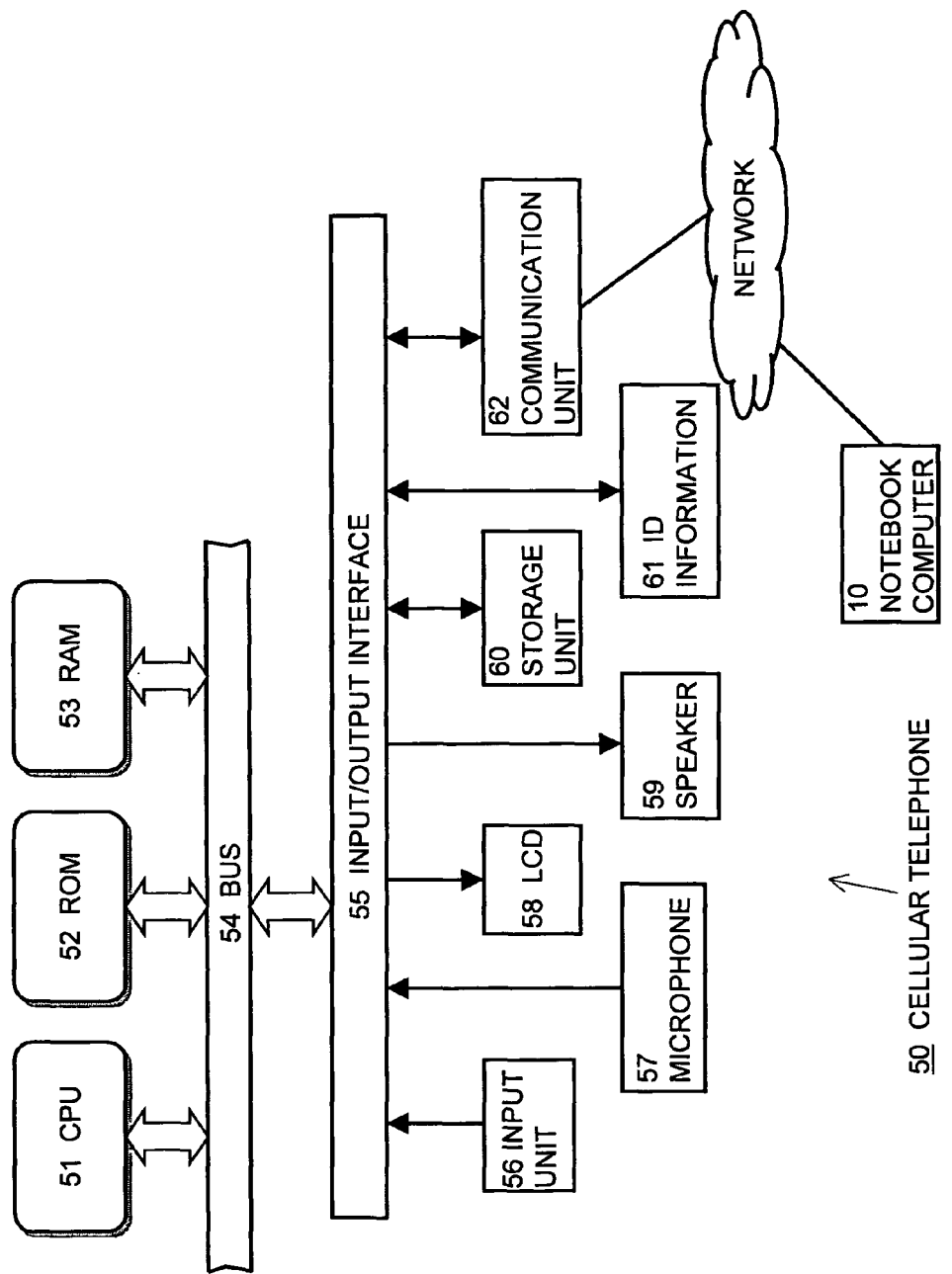
FIG. 3 schematically illustrates the hardware configuration of a portable information terminal 50 used in this embodiment.

FIG. 3 schematically illustrates the hardware configuration of a cellular telephone that can be used as the portable information terminal 50 of this embodiment.

A CPU (Central Processing Unit) 51, which serves as the main controller, executes various applications under the control of an operating system (OS). As shown in FIG. 3, the CPU 51 is interconnected to other devices (described below) via a bus 54.

A ROM (Read Only Memory) 52 is a read only memory used for permanently storing a self-diagnostic program (POST) executed when the portable information terminal 50 is started, or a code group for performing input/output operations (BIOS) via the bus 54. A RAM 53 is a random access memory used for storing program code executed by the CPU 51 or for temporarily storing work data in progress.

The cellular telephone 50 includes a user input unit 56 formed of, for example, operation buttons, an audio-input microphone 57, a screen-output liquid crystal display 58, an audio-output speaker 59, a storage unit 60 for storing various items of information, ID information 61, and a network-connecting communication unit 62. The above-described elements are connected to the bus 54 via an input/output interface 55.

The communication unit 62 connects the cellular telephone 50 to a cellular telephone network, a local area network, for example, a LAN, or a wide area network, for example, the Internet. A plurality of host devices are present on the network, and the system 10 is able to access the host devices according to a predetermined access method.

As the access method, a network address, for example, an IP address, a URL (Uniform Resource Locator)/URI (Uniform Resource Identifier), a telephone number, and other ID numbers can be used. The method for accessing the cellular telephone 50 itself is represented by the ID information 61. The ID information 61 is stored in a format readable by the ID recognition unit 18 (described above).

The ID recognition method is not particularly restricted for implementing the present invention, and any method can be employed as long as one device is able to read the ID information of the other device without the need to establish connection on the network. As the ID recognition method, an RF-ID (non-contact tag), touch net, a barcode, a two-dimensional barcode, or infrared data communication may be used.

Figure 4:
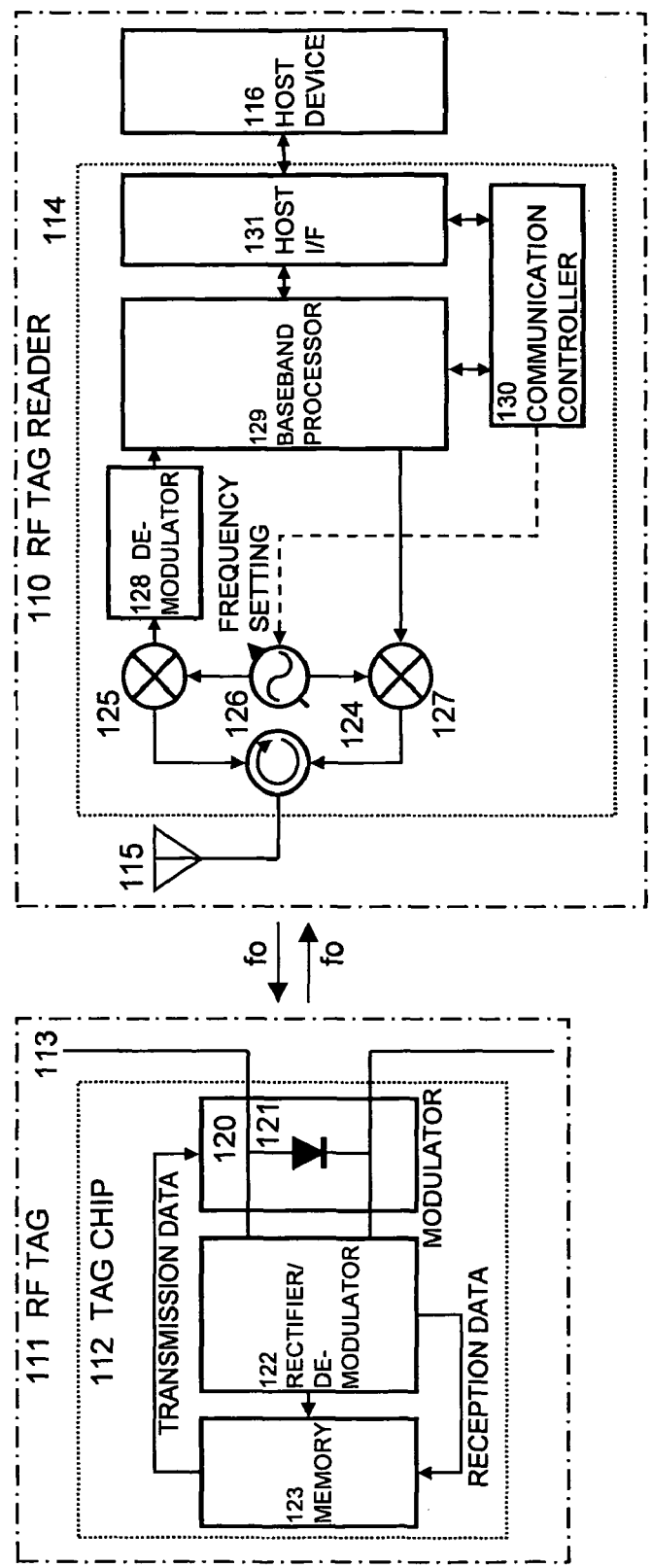
FIG. 4 is a functional block diagram illustrating an operation for reading an RF-ID from an RF tag.

The ID recognition method using an RF-ID can be employed by a combination of an RF tag as the ID information 61 attached to the portable information terminal 50 and the ID recognition unit 18 for reading the RF-ID from the RF tag. FIG. 4 is a functional block diagram illustrating the operation for reading the RF-ID from the RF tag. In FIG. 4, reference numeral 111 indicates an RF tag carrying ID information, which consists of a tag chip 112 and an antenna 113. As the antenna 113, a half-wave dipole antenna can be used. The tag chip 112 consists of a modulator 120, a rectifier/demodulator 122, and a memory 123.

Radio waves $f_o$ transmitted from an RF tag reader 110, which serves as the ID recognition unit, are received by the antenna 113 and are rectified by the rectifier/demodulator 122 so as to be converted into DC power. This DC power starts the operation of the demodulation function and is identified as a read signal for the RF tag 11. The generated power is supplied to the memory 123 and also to the modulator 120. The memory 123 reads the ID information stored therein and sends it to the modulator 120 as transmission data. The modulator 120 is formed as a diode switch 121, which is repeatedly turned ON/OFF by the transmission data. In this case, the radio waves from the RF tag reader 110 are absorbed in the RF tag 111. The radio waves from the RF tag reader 110 are reflected and return to the transmission source. Such a communication method is referred to as the "back-scatter technique". In this manner, the RF tag 111 is able to send information stored therein to the RF tag reader 110 without the need to supply power.

The RF tag reader 110 consists of a tag reading module 114 and an antenna 115 connected to the tag reading module 114, and is used by being connected to a host device. The host device is an information terminal, for example, the above-described notebook computer, and reports a reading instruction given by the RF tag 111 to a communication controller 130 via a host interface 131. Upon receiving the tag read command from the communication controller 130, a baseband processor 129 edits and filters transmission data, and then sends a baseband signal to an ASK (Amplitude Shift Keying) modulator 127. The ASK modulator 127 performs ASK modulation on the baseband signal with frequency $f_o$ of a frequency synthesizer 126. The frequency of the frequency synthesizer 126 is set by the communication controller 130. The ASK-modulated transmission signal is radiated to the RF tag 111 from the antenna 115 via a circulator 124.

A reflection signal returned from the RF tag 111 according to the back-scatter technique, which has the same frequency as the signal transmitted from the RF tag reader 110, is received by the antenna 115 and is input into a mixer 125. Since the same local frequency $f_o$ as that when the signal is transmitted is input into the mixer 125, the signal modulated in the RF tag 111 is output from the mixer 125. A demodulator 128 demodulates the 1/0 data of this signal and sends the demodulated data to the baseband processor 129. The baseband processor 129 decodes the data into the ID information in the RF tag 111. This data is transferred to the host device from the host interface 131 according to an instruction from the communication controller 130.

As described above, the RF tag reader 110 is able to read the information within the RF tag 111. The RF tag reader 110 is also able to write data into the RF tag 111 in a manner similar to the above-described operation.

Figure 5:
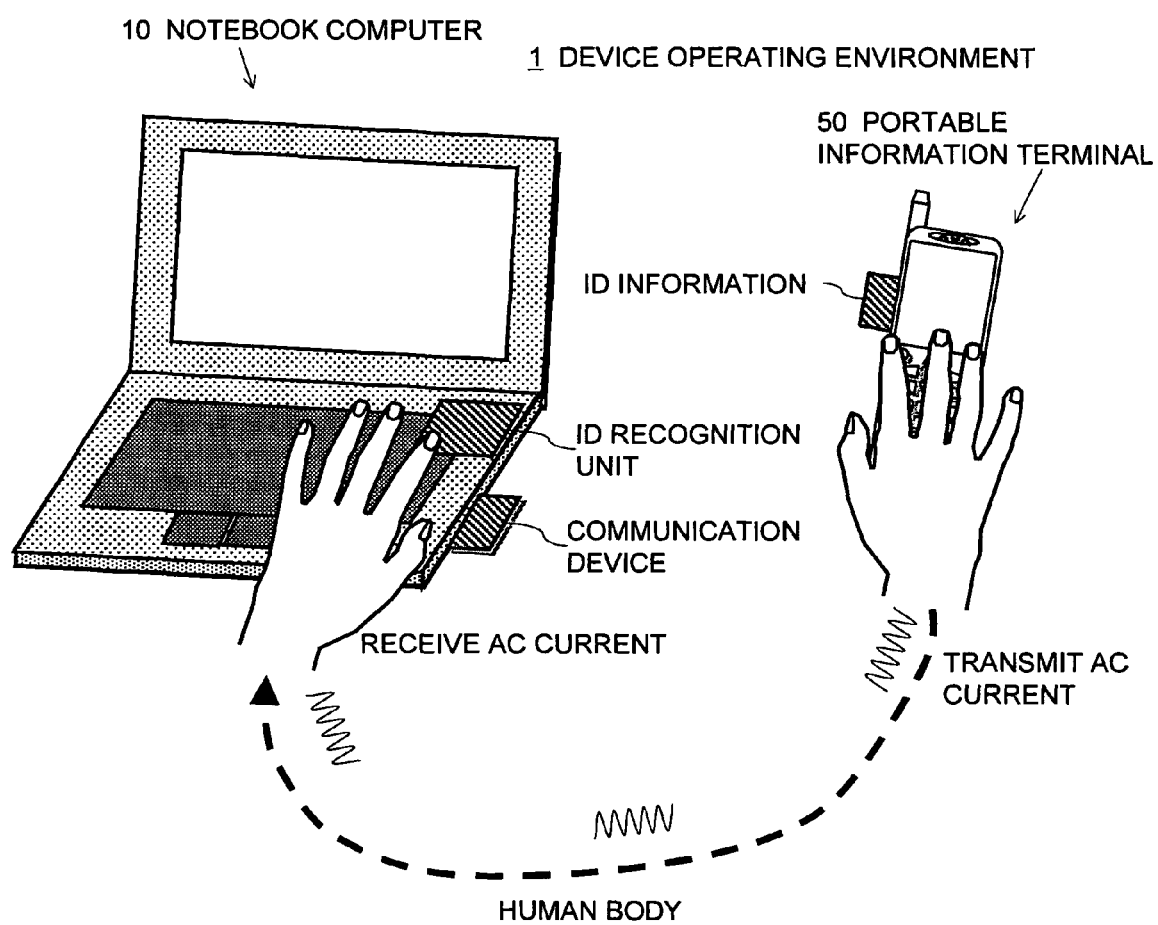
FIG. 5 illustrates an operation for reading ID information by using touch net.

Touch net is a method for transmitting information based on an AC current flowing via the user's body touching both the notebook computer 10 and the cellular telephone 50. The ID recognition unit 18 is able to read the ID information 61 via the human body. FIG. 5 illustrates the transmission of information by touch net. In this case, the ID information 61 stored in the portable information terminal 50 is formed of a generator for generating an AC current corresponding to the ID information and a transmission electrode (not shown). The ID recognition unit 18 includes a reception electrode for receiving an AC current via the human body, and performs AM modulation and A/D conversion on the received current, and then performs digital signal processing on the converted signal so as to decode the ID information, i.e., the network address of the cellular telephone 50.

In the touch net communication implemented via the human body, the configuration disclosed in, for example, Japanese Unexamined Patent Application Publication No. 7-170215 assigned to the present applicant can be used. Since the human body can be considered as a conductive container of saline, it becomes a conductor at a few megahertz (known). For example, the DC resistance across the hands measured by a tester indicates a value from 500 kΩ to 2 or 3 MΩ, depending on the condition of the hands.

According to the ID recognition method using a barcode or a two-dimensional barcode, the portable information terminal 50 stores the ID information 61 therein by attaching the barcode or the two-dimensional barcode to the terminal body. The ID recognition unit 18 of the notebook computer 10 is formed by a barcode reader (known in this field).

Figure 6:
FIG. 6 illustrates an example of the configuration of a linear barcode.

A linear barcode is formed such that the barcode, for example, a JAN or ITF code, is linearly disposed (see FIG. 6). The two-dimensional barcode is a type of barcode having information in two dimensions, i.e., in the horizontal direction and the vertical direction. It is necessary that a two-dimensional code scanner as the ID reading means read the two-dimensional code while identifying it as a plane. The two-dimensional code is largely divided into a stack format and a matrix format (see http://www.barcode.co.jp/barcode/2-tokusyu.html).

Figure 7:
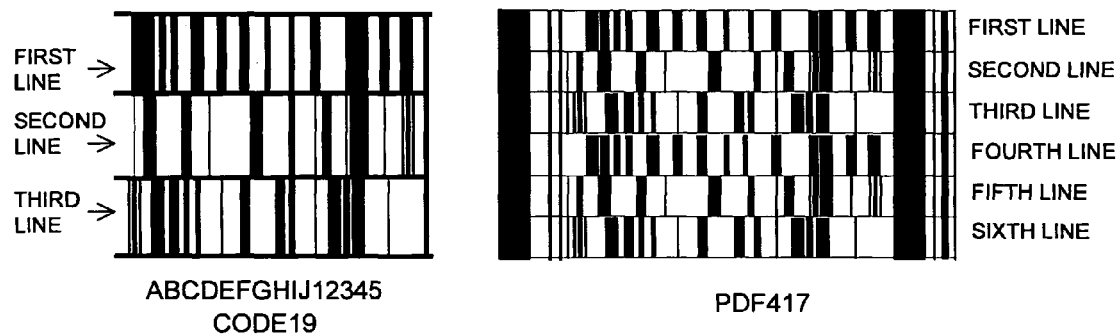
FIG. 7 illustrates an example of the configuration (stack format) of a two-dimensional barcode.

The stack format is a barcode formed by displaying information in the vertical and horizontal directions by stacking linear barcodes in the vertical direction. In this structure, the linear barcodes are shrunk and are vertically stacked in a plurality of lines (see FIG. 7). The symbol is represented by thin bars and thick bars (or narrow spaces and wide spaces) as in the linear barcode, and the reading method is substantially the same as that of the linear barcode.

Figure 8:
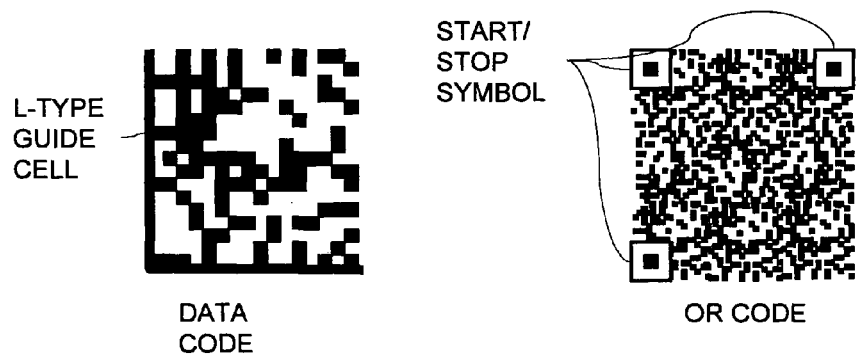
FIG. 8 illustrates an example of the configuration (matrix format) of the two-dimensional barcode.

The matrix format is a barcode formed by displaying information alternately in black and white cells in a matrix mosaic (see FIG. 8). For identifying data rows, a start sign and a stop sign are added to each row, and it does not matter which row is read first, and when all the rows are read, the barcode is deciphered as data.

According to the ID recognition method using a cybercode, the portable information terminal 50 stores the ID information 61 by attaching a cybercode to the terminal body. The ID recognition unit 18 of the notebook computer 10 is formed by an image-pickup and image-recognition device for identifying an image by capturing the cybercode.

Figure 9:
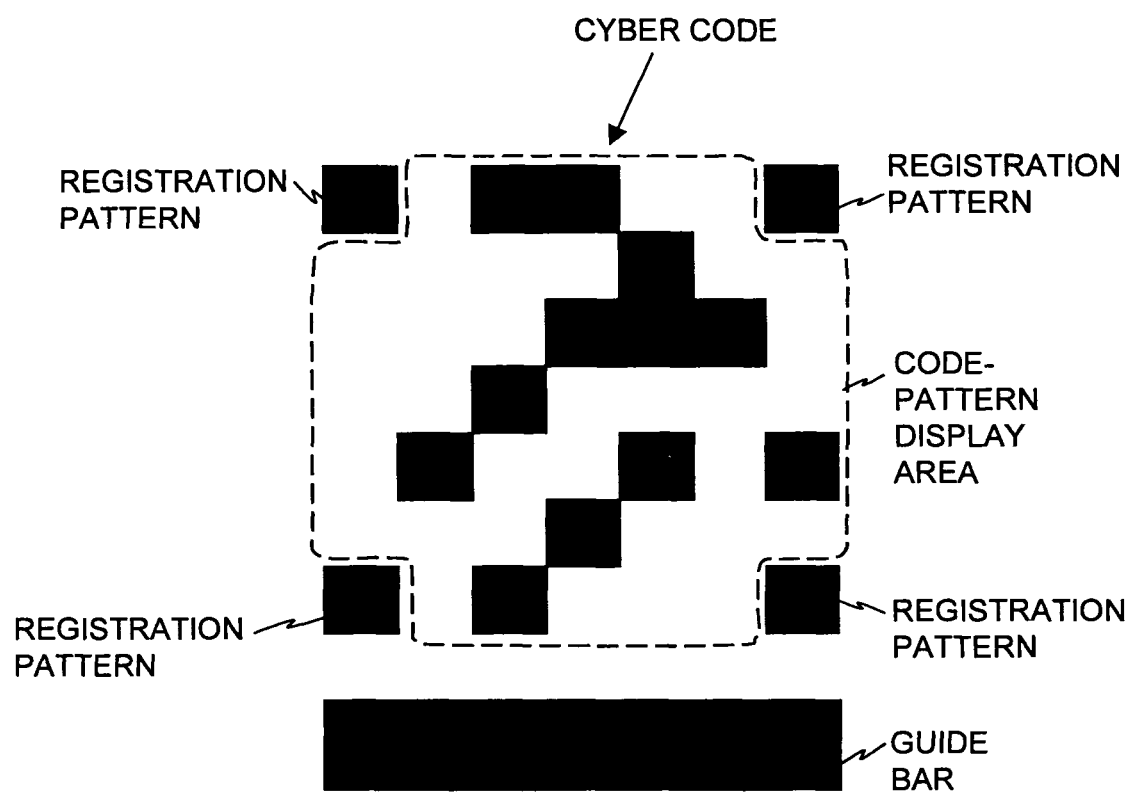
FIG. 9 illustrates an example of the configuration of a cybercode.

A cybercode is one type of two-dimensional barcode, and it is formed of, as shown in FIG. 9, a "guide-bar display area" indicating the presence of a cybercode and a "code-pattern display area" indicating a two-dimensional code pattern. The code-pattern display area is formed of n×m–matrix cells (7×7 cells in FIG. 9), and ID information can be provided by representing the cells in binary format in black or white. It should be noted that the cells at the four corners of the code-pattern display area are always indicated in a black pattern, not as the ID information, but as the registration pattern.

The cybercode recognition process is largely divided into a step of binarizing a captured image, a step of finding candidates of the guide bar from the binary image, a step of searching for the corner cells based on the position and direction of the guide bar, and a step of decoding the image bit map pattern in response to the detection of the guide bar and the corner cells. Error bit checking is also performed to determine that a valid cybercode is contained in the captured image, and the ID information and the positional information of the code can be read. Also, distortion caused by the displacement of a camera or an object can be calculated and compensated for based on the positions of the corner cells.

Details of the cybercode are also disclosed in, for example, Japanese Unexamined Patent Application Publication No. 2000-82108 (TWO-DIMENSIONAL CODE RECOGNITION PROCESSING METHOD, TWO-DIMENSIONAL CODE RECOGNITION PROCESSING DEVICE, AND MEDIUM") assigned to the present applicant.

As described above, the user simply places the portable information terminal 50 in proximity with the ID recognition unit of the notebook computer 10, and then, the ID recognition unit 18 can read the ID information 61 from the portable information-terminal 50. The notebook computer 10 is thus able to obtain the method for accessing the portable information terminal 50. By using the access method, for example, the network address, the notebook computer 10 establishes a network connection with the portable information terminal 50 so that they can communicate with each other. The notebook computer 10 also sends operation information suitable for the processing state of the notebook computer 10 to the portable information terminal 50 via a network. As a result, the portable information terminal 50 is able to remotely control the notebook computer 10 by using a suitable GUI screen.

Figure 10:
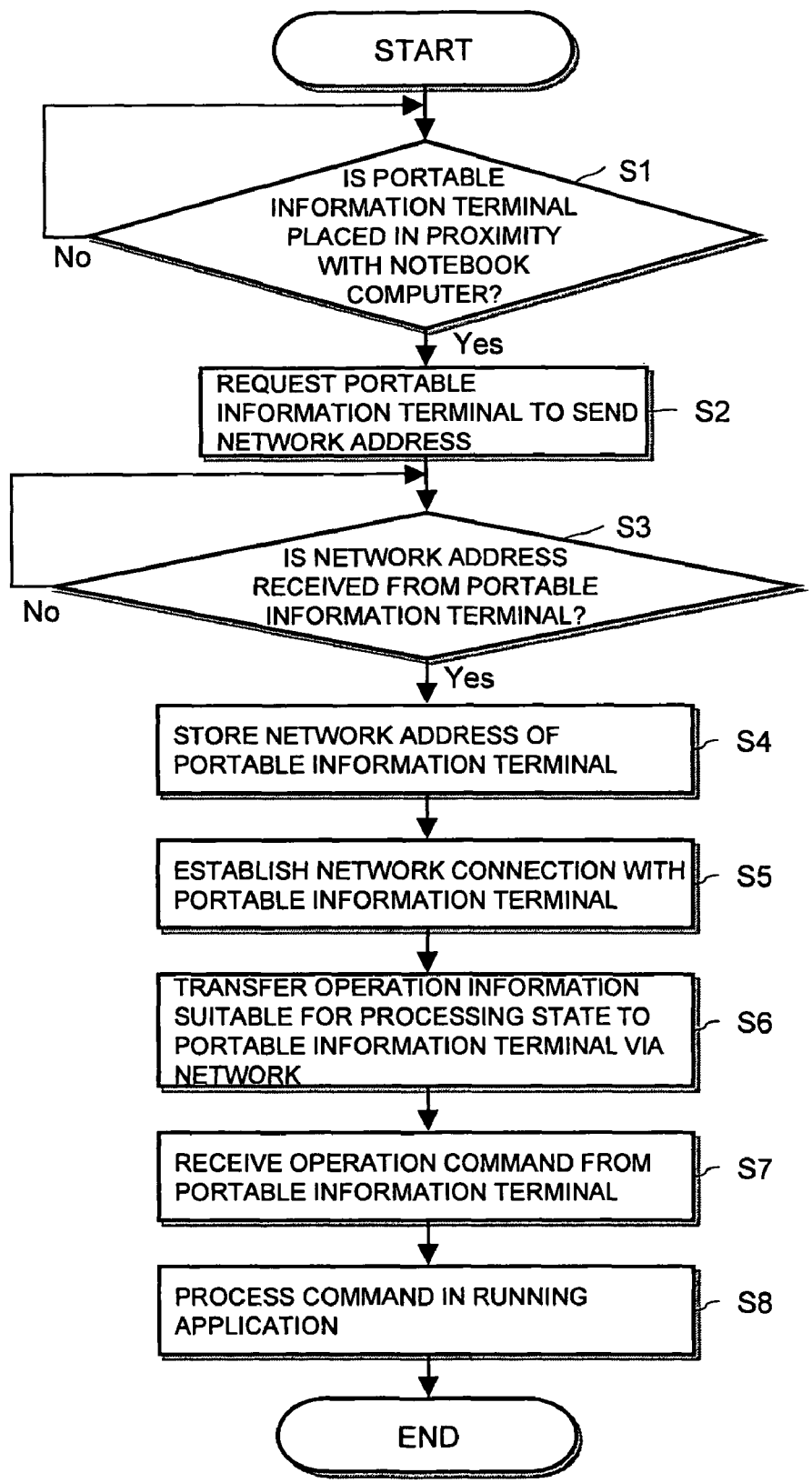
FIG. 10 is a flowchart illustrating the operation performed by the notebook computer 10 in a device operating environment 1 according to this embodiment.

FIG. 10 is a flowchart illustrating the operation performed by the notebook computer 10 under the device operating environment 1 according to this embodiment. In practice, this operation is implemented by executing a predetermined program code by the CPU 11. The operation characteristics of the notebook computer 10 are described below with reference to the flowchart of FIG. 10.

When the portable information terminal 50 owned by the user is placed in proximity with the notebook computer 10 (step S1), the notebook computer 10 requests the portable information terminal 50 to send the network address (or the method for accessing the portable information terminal 50 written in another format) (step S2).

The portable information terminal 50 possesses the access method, for example, the network address, as the ID information. In practice, the transmission request of the network address is made by reading the ID information by the ID recognition unit 18. The ID recognition method is not particularly restricted, and a non-contact recognition method, for example, the above-described RF-ID, touch net, barcode, two-dimensional barcode, cybercode, or infrared communication, can be used.

Upon receiving the network address of the portable information terminal 50 by identifying the ID information 16 (step S3), the computer 10 stores the network address in a writable memory, for example, the RAM 13, or a non-volatile storage unit, for example, the HDD 22 (step S4).

Then, by using the obtained network address, the notebook computer 10 establishes connection with the portable information terminal 50 (step S5).

Then, the notebook computer 10 sends operation information suitable for the processing state of the computer 10 to the portable information terminal 50 via a network (step S6).

This operation information includes user interface information, for example, an operation screen (GUI: Graphical User Interface) suitable for operating the notebook computer 10 by the portable information terminal 50. If, for example, presentation software is running on the notebook computer 10, GUI screen information for operating the presentation by using the display screen of the portable information terminal 50 is transferred to the portable information terminal 50 as the operation information via a network.

As a result, the user is able to remotely control the presentation being worked on the notebook computer 10 by using the operation screen and the operation buttons of the portable information terminal 50. That is, the notebook computer 10 receives a command sent from the portable information terminal 50 via a network (step S7), and performs command processing in a running application (step S8).

Figure 11:
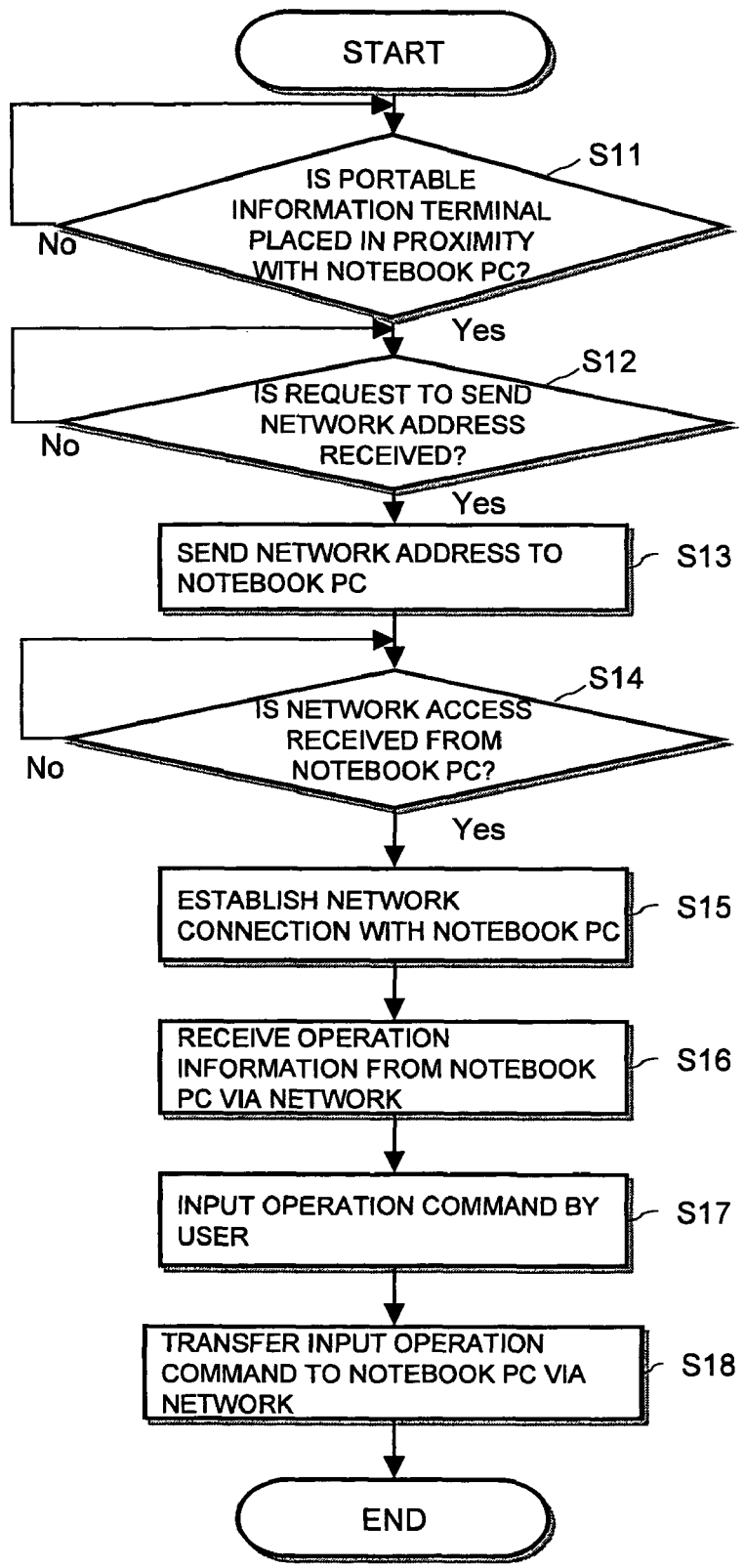
FIG. 11 is a flowchart illustrating the operation performed by the portable information terminal 50 in the device operating environment 1 according to this embodiment.

FIG. 11 is a flowchart illustrating the operation performed by the portable information terminal 50 under the device operating environment 1 according to this embodiment. In practice, this operation is implemented by executing a predetermined program code by the CPU 51. The operation characteristics of the portable information terminal 50 are described below with reference to the flowchart of FIG. 11.

When the portable information terminal 50 owned by the user is placed in proximity with the notebook computer 10 (step S11), the portable information terminal 50 first receives a request to send the network address (or the method for accessing the portable information terminal 50 written in another format) from the notebook computer 10 (step S12).

The portable information terminal 50 possesses the access method, for example, the network address, as the ID information. The transmission of the network address is performed by reading the ID information by the ID recognition unit 18 (step S13). The ID recognition method is not particularly restricted, and the above-described RF-ID, touch net, barcode, two-dimensional barcode, cybercode, or infrared communication, can be used.

The notebook computer 10 attempts to establish a network connection with the portable information terminal 50 based on the received network address (step S14). In response to this attempt, the portable information terminal 50 establishes a network connection with the notebook computer 10 (step S15).

The portable information terminal 50 receives the operation information sent from the notebook computer 10 via a network (step S16).

This operation information includes user interface information, for example, an operation screen (GUI: Graphical User Interface) suitable for operating the notebook computer 10 by the portable information terminal 50. If, for example, presentation software is running on the notebook computer 10, GUI screen information for operating the presentation by using the display screen of the portable information terminal 50 is transferred to the portable information terminal 50 via a network as the operation information.

As a result, the user is able to remotely control the presentation being worked on the notebook computer 10 by using the operation screen and the operation buttons displayed on the portable information terminal 50 which can be easily handed by the user. More specifically, when the user inputs an operation command for the notebook computer 10 via the input unit 56 (step S17), the portable information terminal 50 sends the input operation command to the notebook computer 10 via a network (step S18). In response to this operation command, the notebook computer 10 performs command processing in a running application.

Figure 12:
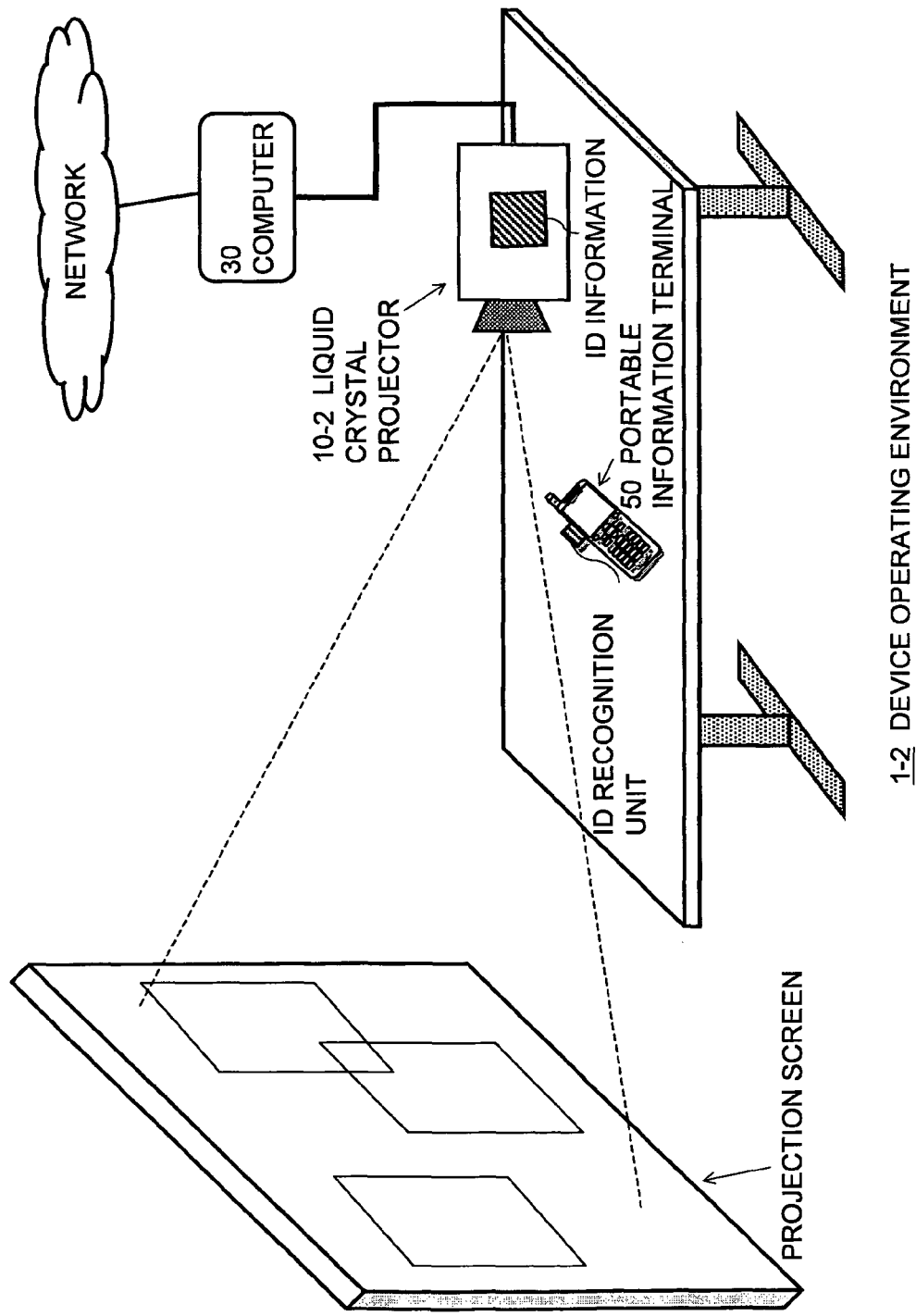
FIG. 12 illustrates a device operating environment 1-2 according to another embodiment of the present invention.

FIG. 12 illustrates a device operating environment 1-2 according to another embodiment of the present invention. In this device operating environment 1-2, an information processing device 10-2, for example, a liquid crystal projector used by the user, and the small portable information terminal 50, for example, a cellular telephone or a PDA (Personal Digital Assistant), owned by the user are provided.

In the example shown in FIG. 12, the liquid crystal projector 10-2 possesses ID information, and is also provided with a communication device connected to a network, such as a cellular telephone network, a wireless LAN (Local Area Network), for example, IEEE802.11b, or short-distance wireless data communication, for example, Bluetooth communication. Alternatively, instead of the liquid crystal projector 10-2 itself, a computer 30 for driving the display of the liquid crystal projector 10-2 may be provided with a communication device. In this embodiment, the ID information possessed by the liquid crystal projector 10-2 indicates the network address of the liquid crystal projector 10-2 or the method for accessing the site (for example, the computer 30 for transferring drawing information to the liquid crystal projector) in which operation information of the liquid crystal projector 10-2 is stored.

The portable information terminal 50 is provided with a communication device connected to a network such as a cellular telephone network, a wireless LAN (Local Area Network), for example, IEEE802.11b, or short-distance wireless data communication, for example, Bluetooth communication, and also possesses an ID recognition unit for reading the ID information from the liquid crystal projector 10-2. The portable information terminal 50 is also provided with user interfaces, for example, a screen, operation buttons, and input keys, for performing a device operation.

By reading the ID information from the liquid crystal projector 10-2 by using the ID recognition unit provided for the portable information terminal 50, the portable information terminal 50 is able to obtain the method for accessing the liquid crystal projector 10-2 or the site storing the operation information of the liquid crystal projector 10-2.

In the device operating environment 1-2 shown in FIG. 12, the user places the portable information terminal 50 in proximity with the ID information of the liquid crystal projector 10-2. In response to this operation, the ID recognition unit reads the ID information from the liquid crystal projector 10-2 so that the portable information terminal 50 can identify the method for accessing the liquid crystal projector 10-2 or the site storing the operation information of the liquid crystal projector 10-2. By using the access method, for example, the network address or a URL, obtained by reading the ID, the portable information terminal 50 establishes a network connection with the liquid crystal projector 10-2 or the computer 30 storing the operation information of the liquid crystal projector 10-2 so that they can communicate with each other.

The liquid crystal projector 10-2 or the computer 30 storing the operation information of the liquid crystal projector 10-2 also sends or downloads the operation information suitable for the processing state of the liquid crystal projector 10-2 or the computer 30 to the portable information terminal 50 via a network. This operation information includes user interface information, for example, an operation screen (GUI: Graphical User Interface) suitable for operating the notebook computer 10 by the portable information terminal 50.

Figure 13:
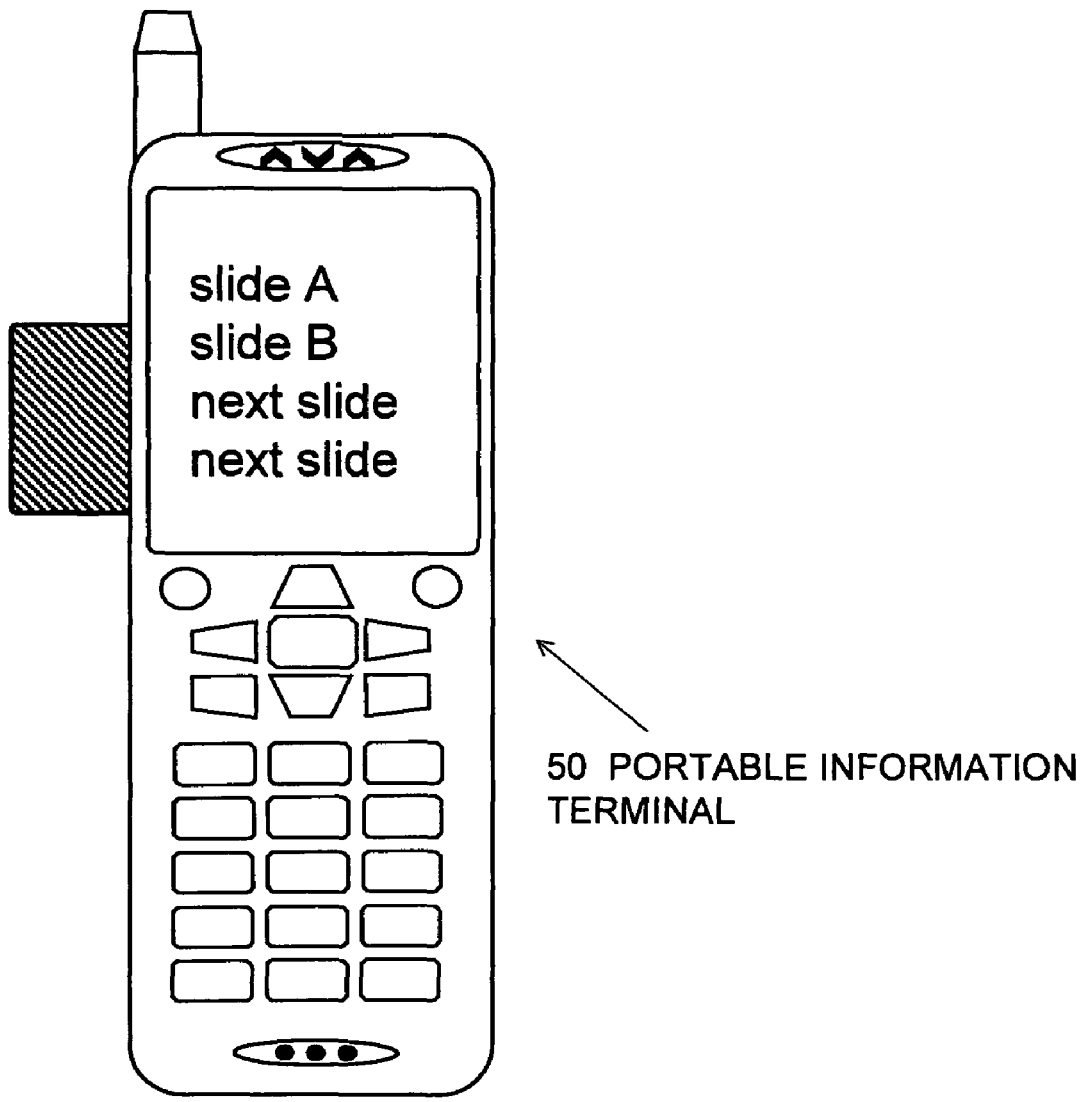
FIG. 13 illustrates an example of the configuration of a GUI, displayed on the display screen of the portable information terminal 50, suitable for operating a liquid crystal projector 10-2.

As a result, on the display screen of the portable information terminal 50, a GUI screen, such as that shown in FIG. 13, suitable for operating the liquid crystal projector 10-2 is presented. The user is then able to input an operation, for example, specifying a slide to be projected on the projection screen, via the GUI screen shown in FIG. 13. An operation command input by the user is sent to the liquid crystal projector 10-2 or the computer 30 storing the operation information of the liquid crystal projector 10-2 via a network. Accordingly, the user is able to remotely control the liquid crystal projector 10-2 efficiently and easily by using desired operation buttons while referring to a menu list displayed on the GUI screen of the portable information terminal 50.

Figure 14:
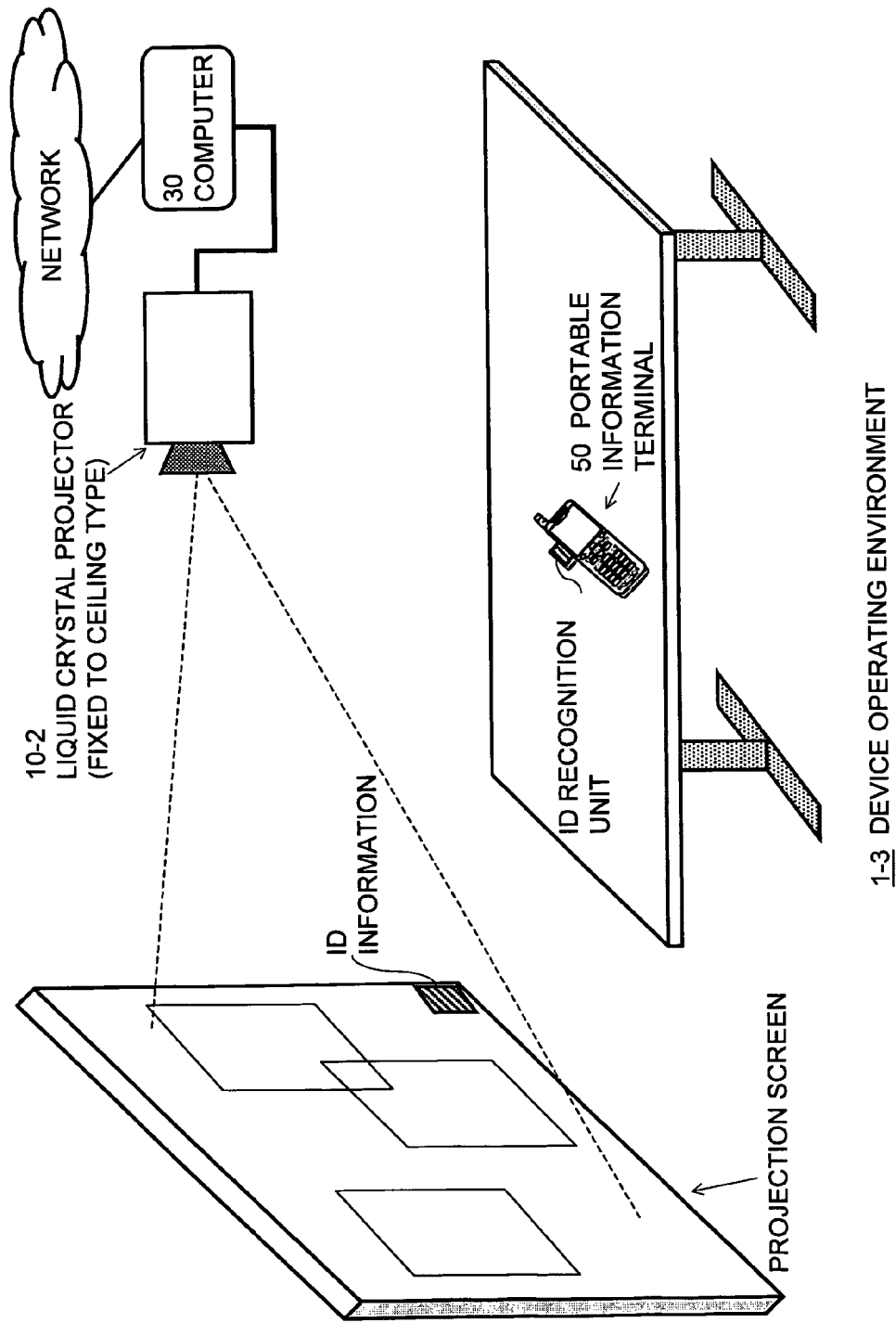
FIG. 14 illustrates a device operating environment 1-3 according to still another embodiment of the present invention.

FIG. 14 illustrates a device operating environment 1-3 according to still another embodiment of the present invention. In this device operating environment 1-3, the information processing device 10-2, for example, a liquid crystal projector, used by the user, and the small portable information terminal 50, for example, a cellular telephone or a PDA (Personal Digital Assistant), owned by the user are provided.

In the example shown in FIG. 14, the liquid crystal projector 10-2 possesses ID information, and is also provided with a communication device connected to a network, such as a telephone network, a wireless LAN (Local Area Network), for example, IEEE802.11b, or short-distance wireless data communication, for example, Bluetooth communication. Alternatively, instead of the liquid crystal projector 10-2 itself, the computer 30 for driving the display of the liquid crystal projector 10-2 may be provided with a communication device. In the device operating environment 1-3 according to this embodiment, the liquid crystal projector 10-2 is a fixed to ceiling type installed indoors out of reach of the user.

The portable information terminal 50 is provided with a communication device connected to a network such as a cellular telephone network, a wireless LAN (Local Area Network), for example, IEEE802.11b, or short-distance wireless data communication, for example, Bluetooth communication, and also possesses an ID recognition unit for reading the ID information from the liquid crystal projector 10-2. The portable information terminal 50 is also provided with user interfaces, for example, a screen, operation buttons, and input keys, for performing a device operation.

In this embodiment, ID information indicating the network address is assigned to the liquid crystal projector 10-2 or the site (for example, the computer 30 for transferring drawing information to the liquid crystal projector) in which the operation information of the liquid crystal projector 10-2 is stored. This embodiment differs from the embodiment shown in FIG. 12 in that ID information is stored in a place within the reach of the user, for example, in a projection screen rather than in the liquid crystal projector 10-2, which is a fixed to ceiling type installed indoors out of reach of the user. Instead of the projection screen, the ID information may be stored in another place associated with a function implemented by the liquid crystal projector 10-2 which is to be remotely controlled by the portable information terminal 50.

By reading the ID information from the projection screen by using the ID recognition unit provided for the portable information terminal 50, the portable information terminal 50 is able to obtain the network address for accessing the liquid crystal projector 10-2 or the computer 30 storing the operation information of the liquid crystal projector 10-2.

In the device operating environment 1-3 shown in FIG. 14, the user places the portable information terminal 50 in proximity with the ID information of the projection screen. By reading the ID information from the projection screen by using the ID recognition unit, the portable information terminal 50 is able to obtain the method for accessing the liquid crystal projector 10-2 or the computer 30 storing the operation information of the liquid crystal projector 10-2. By using the access method, for example, the network address or a URL, the portable information terminal 50 establishes a network connection with the liquid crystal projector 10-2 or the computer 30 storing the operation information of the liquid crystal projector 10-2 so that they can communicate with each other.

The liquid crystal projector 10-2 or the computer 30 storing the operation information of the liquid crystal projector 10-2 also sends or downloads the operation information suitable for the processing state of the liquid crystal projector 10-2 or the computer 30 to the portable information terminal 50 via a network. This operation information includes user interface information, for example, an operation screen (GUI: Graphical User Interface) suitable for operating the slides of the liquid crystal projector 10-2 by the portable information terminal 50.

As a result, on the display screen of the portable information terminal 50, a GUI screen suitable for operating the liquid crystal projector 10-2, such as that shown in FIG. 13, is presented (described above). The user is then able to input an operation, for example, specifying a slide to be projected on the projection screen, via the GUI screen shown in FIG. 13. An operation command input by the user is sent to the liquid crystal projector 10-2 or the computer 30 for controlling the display of the liquid crystal projector 10-2 via a network. Accordingly, the user is able to remotely control the liquid crystal projector 10-2 efficiently and easily by using desired operation buttons while referring to a menu list displayed on the GUI screen of the portable information terminal 50.

Figure 15:
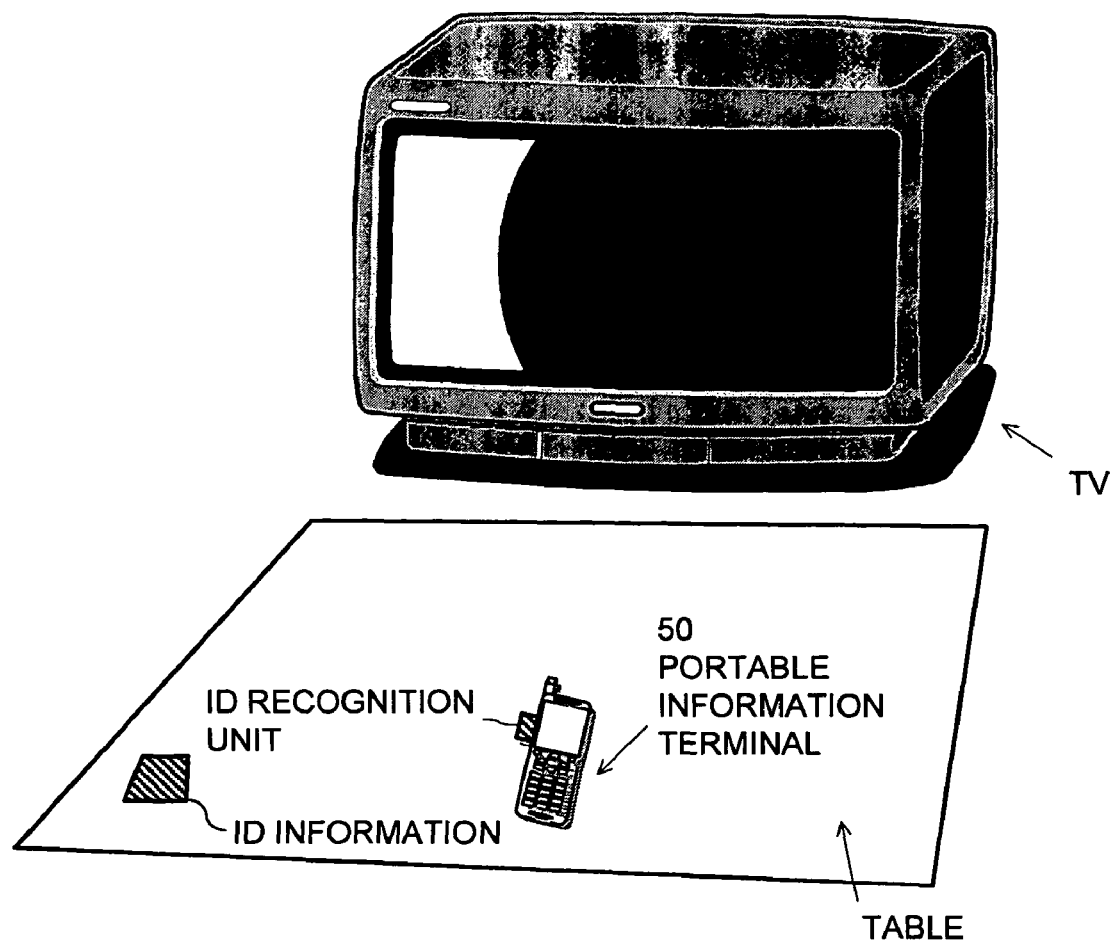
FIG. 15 illustrates a device operating environment 1-4 according to a further embodiment of the present invention.

FIG. 15 illustrates a device operating environment 1-4 according to a further embodiment of the present invention. This device operating environment 1-4 assumes a living room in a household, in which a volume-adjustable television receiver (TV) for receiving and displaying broadcast programs according to a predetermined channel tuning operation and a table are provided.

In this embodiment, the television receiver (TV) or the site for providing operation information of the television receiver is provided with a communication device connected to a network such as a telephone network, a wireless LAN (Local Area Network), for example, IEEE802.11b, or short-distance wireless data communication, for example, Bluetooth communication.

The portable information terminal 50 owned by the user is provided with a communication device connected to a network such as a cellular telephone network, a wireless LAN (Local Area Network), for example, IEEE802.11b, or short-distance wireless data communication, for example, Bluetooth communication, and also possesses an ID recognition unit for reading the ID information. The portable information terminal 50 is also provided with user interfaces, for example, a screen, operation buttons, and input keys, for performing a device operation.

ID information indicating the network address is assigned to the television receiver itself or the site storing the operation information of the television receiver. The television receiver is away from the user sitting around the table, and the portable information terminal 50 is unable to read the ID information from the television receiver. In this embodiment, therefore, the ID information of the television receiver is attached on the table. The ID information may be provided in another place, other than the table, associated with the audiovisual operation of the television receiver which is to be remotely operated by the portable information terminal 50.

By reading the ID information from the table by using the ID recognition unit provided for the portable information terminal 50, the portable information terminal 50 is able to obtain the method for accessing the television receiver or the site storing the operation information of the television receiver.

In the device operating environment 1-4 shown in FIG. 15, the user places the portable information terminal 50 in proximity with the ID information on the table. By reading the ID information from the table by using the ID recognition unit, the portable information terminal 50 is able to identify the method for accessing the television receiver or the site storing the operation information of the television receiver. By using the access method, for example, the network address or a URL, the portable information terminal 50 establishes a network connection with the television receiver or the site storing the operation information of the television receiver so that they can communicate with each other.

The television receiver or the site storing the operation information of the television receiver also sends or downloads the operation information suitable for the processing state of the television receiver to the portable information terminal 50 via a network. This operation information includes user interface information, for example, an operation screen (GUI: Graphical User Interface) suitable for controlling the channel tuning or adjusting the volume of the television receiver by the portable information terminal 50.

Figure 16:
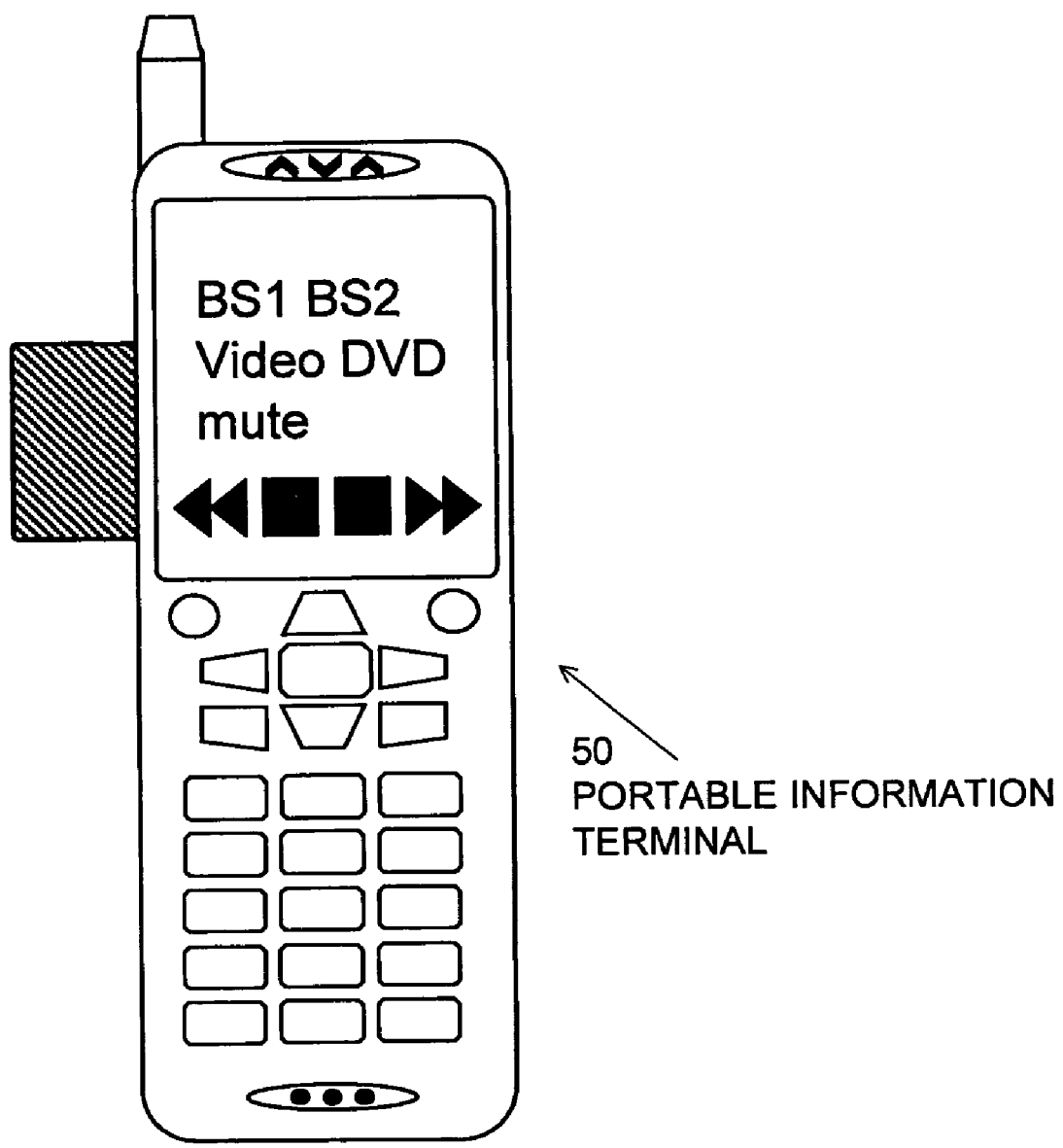
FIG. 16 illustrates an example of the configuration of a GUI, displayed on the display screen of the portable information terminal 50, suitable for operating a television receiver.

As a result, on the display screen of the portable information terminal 50, a GUI screen suitable for operating the television receiver, such as that shown in FIG. 16, is presented (described above). The user is then able to input an operation, for example, specifying a channel to be received, increasing or decreasing the volume, or playing back video, via the GUI screen shown in FIG. 16. An operation command input by the user is sent to the television receiver via a network. Accordingly, the user is able to remotely control the television receiver efficiently and easily by using desired operation buttons while referring to a menu list displayed on the GUI screen of the portable information terminal 50.

Figure 17:
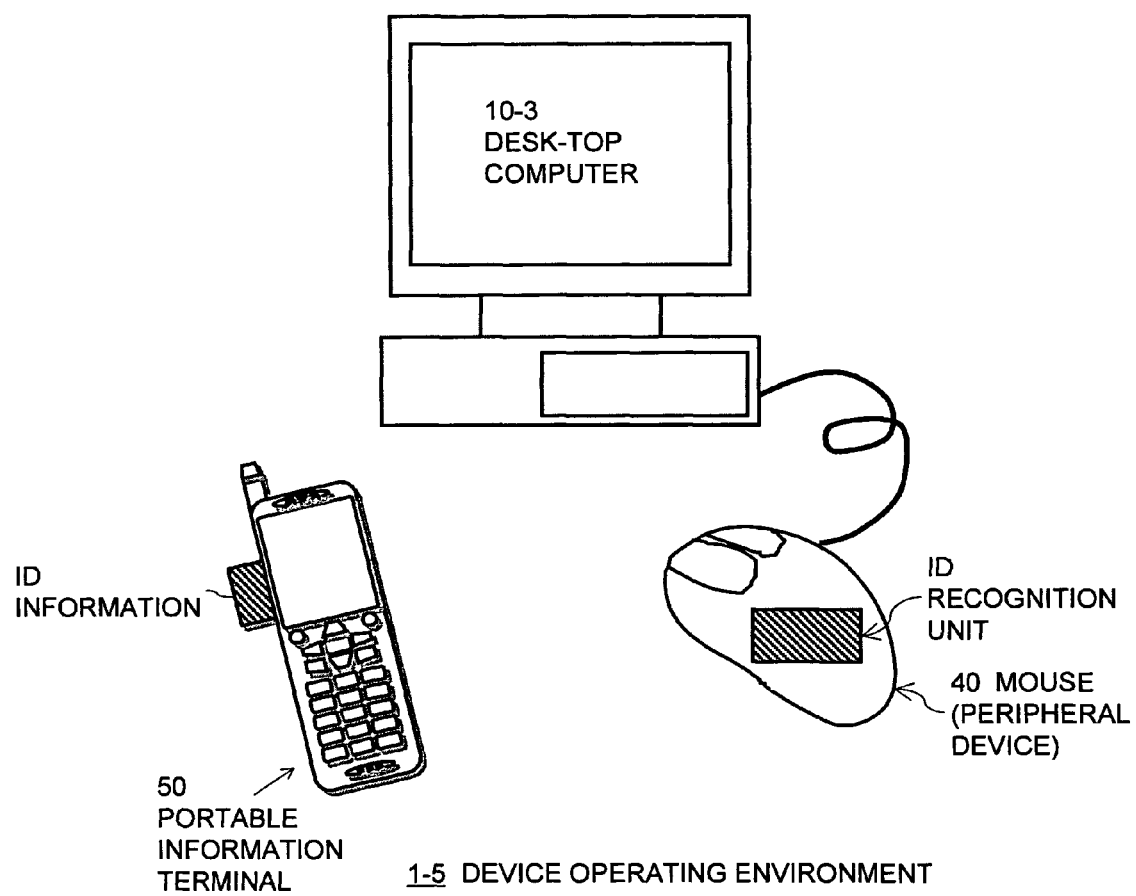
FIG. 17 illustrates a device operating environment 1-5 according to a yet further embodiment of the present invention.

FIG. 17 illustrates a device operating environment 1-5 according to a yet further embodiment of the present invention. In this device operating environment 1-5, as shown in FIG. 17, a fixed information processing device 10-3, for example, a desk-top computer used by the user, a user input device 40, for example, a mouse connected to the desk-top computer 10-3 by cable or cordlessly, and the small portable information terminal 50, for example, a cellular telephone or a PDA (Personal Digital Assistant), owned by the user are provided.

In the example shown in FIG. 17, the portable information terminal 50 is provided with a communication device connected to a network such as a cellular telephone network, a wireless LAN (Local Area Network), for example, IEEE802.11b, or short-distance wireless data communication, for example, Bluetooth communication, and also possesses ID information. In this embodiment, the ID information possessed by the portable information terminal 50 indicates the method for accessing the portable information terminal 50. As the access method, a network address, for example, an IP address, resource ID information, for example, a URL/URI, a telephone number, and other ID numbers can be used. The portable information terminal 50 is provided with user interfaces, for example, a screen, operation buttons, and input keys for performing a device operation.

The desk-top computer 10-3 is provided with a communication device connected to a network such as a telephone network, a wireless LAN (Local Area Network), for example, IEEE802.11b, or short-distance wireless data communication, for example, Bluetooth communication.

This embodiment differs from the embodiment shown in FIG. 1 in that the ID recognition unit for reading the ID information from the portable information terminal 50 is provided in a peripheral device, for example, the mouse 40 (or may be a keyboard or a display) rather than the main unit of the computer 10-3.

For example, if the ID recognition unit is provided for a user input/output unit placed near the user, for example, the mouse 40, the ID information can be reliably read from the portable information terminal 50 when the main unit of the computer 10-3 is installed in a place away from the portable information terminal 50, for example, under the desk.

By reading the ID information from the portable information terminal 50 by using the ID recognition unit, the desk-top computer 10-3 is able to obtain the method, for example, the network address, for accessing the portable information terminal 50. The ID recognition unit may be provided for the portable information terminal 50 rather than the mouse 40 of the desk-top computer 10-3, in which case, the portable information terminal 50 reads the ID information, i.e., the network address, of the desk-top computer 10-3 possessed in the mouse 40.

In the device operating environment 1-5 shown in FIG. 17, the user places the portable information terminal 50 in proximity with the ID recognition unit of the mouse 40 connected to the desk-top computer 10-3. By reading the ID information from the portable information terminal 50 by using the ID recognition unit, the desk-top computer 10-3 is able to obtain the network address for accessing the portable information terminal 50. By reading this network address, the desk-top computer 10-3 establishes a network connection with the portable information terminal 50 so that they can communicate with each other.

The desk-top computer 10-3 also sends operation information suitable for the processing state of the desk-top computer 10-3 to the portable information terminal 50 via a network. This operation information includes user interface information, for example, an operation screen (GUI: Graphical User Interface) suitable for operating the desk-top computer 10-3 by the portable information terminal 50.

If, for example, presentation software is running on the desk-top computer 10-3, GUI screen information for operating the presentation by using the display screen of the portable information terminal 50 is transferred to the portable information terminal 50 via a network. As a result, the user is able to efficiently and easily perform a remote control operation on the presentation being worked on the desk-top computer 10-3 by using the operation screen and the operation buttons of the portable information terminal 50.

In the embodiments shown in FIGS. 12, 14, and 15, the ID information, for example, an RF tag, is provided for a machine to be remotely controlled, and the ID recognition unit is provided in the portable information terminal 50 to remotely control the machine. Then, the operation information for performing a remote control operation is made available in an information providing server (for example, the computer 30) on the network. The remotely controlled machine possesses the method for accessing the information providing server as the ID information, and then, the portable information terminal 50 can obtain the access method, for example, a URL/URI, by identifying the ID so as to download the operation information stored in the information providing server into the terminal.

One of the advantages in making the operation information available in an information providing server is to enable a machine manufacturer to centrally manage the operation information concerning the same product in a specific information providing server. For example, when updating the operation information, the manufacturer does not have to distribute new operation information to all the machines or all the users purchased the machines.

When comparing the ID information with the ID recognition unit, for example, an RF tag with an RF tag reader, the structure of the ID information is simpler than that of the ID recognition unit. Accordingly, unlike the above-described embodiments, it is preferable that the ID information be provided in the portable information terminal 50 and the ID recognition unit be provided for a machine to be controlled. In this case, it is also preferable that operation information be made available in an information providing server.

Figure 18:
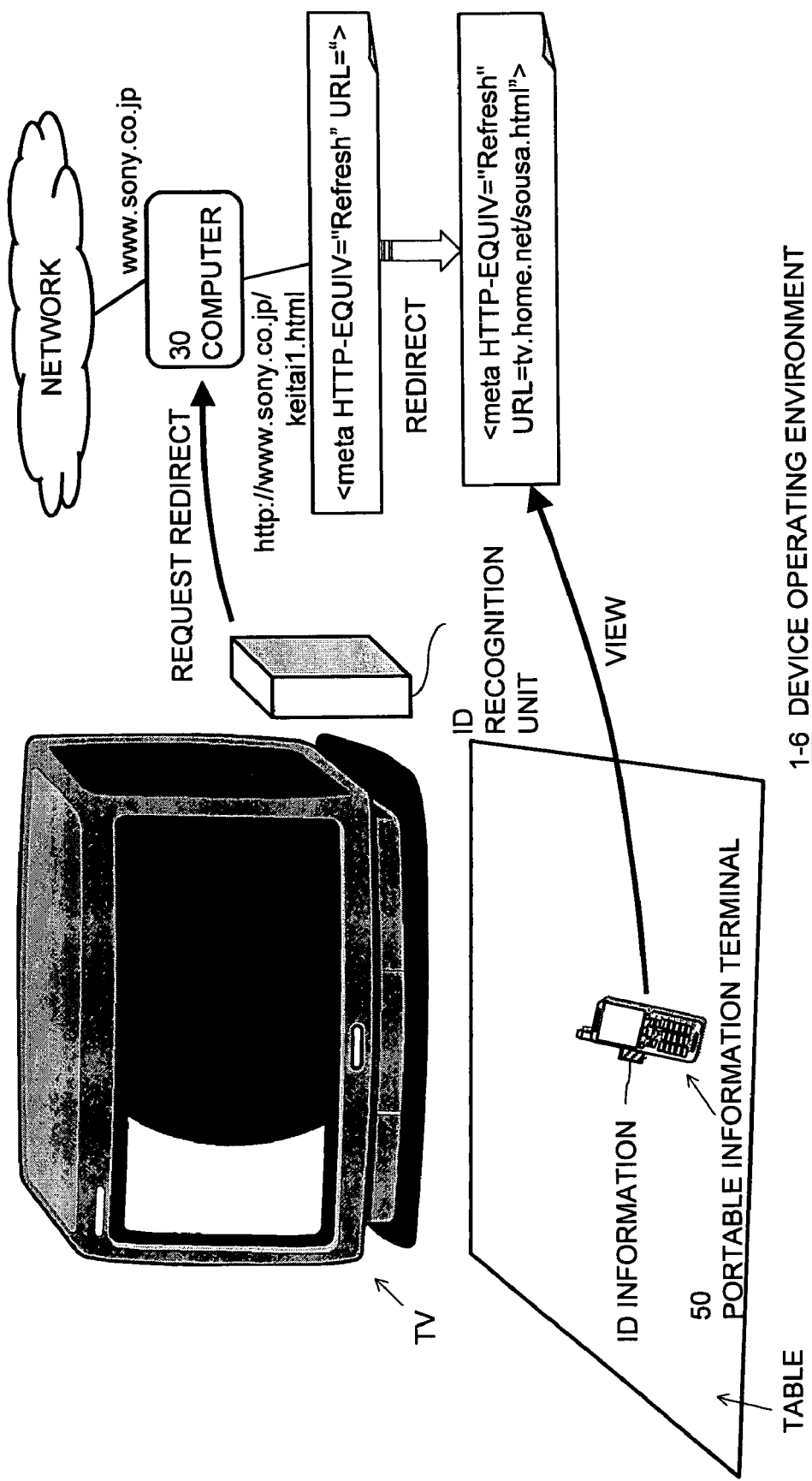
FIG. 18 illustrates a device operating environment 1-6 according to a further embodiment of the present invention.

Accordingly, a device operating environment 1-6 shown in FIG. 18 is now considered. In this device operating environment 1-6, a TV receiver to be remotely controlled, and the portable information terminal 50 for remotely controlling the TV receiver by obtaining operation information are provided. The portable information terminal 50 possesses ID information, and the ID recognition unit is disposed at the top of the main unit (or near the main unit) of the TV receiver.

The portable information terminal 50 has an information storage location of its own in the information providing server 30, for example, in the computer 30, and possesses the method for accessing the storage location as the ID information. As the access method, for example, a resource identifier written in the format of a URL or URI can be used. By reading the ID information, the ID recognition unit is able to identify the method for accessing the information storage location so that the operation information can be sent and received via the storage location. The process for providing the operation information is described below more specifically.

The user places the portable information terminal 50 in proximity with the ID recognition unit installed near the TV receiver to be operated by the user so as to allow the ID recognition unit to identify the ID information.

The portable information terminal 50 stores the method for accessing the information storage location unique to the portable information terminal 50 as the ID information. The access method can be written in the format of a resource identifier, for example, a URL or URI, and it is now assumed that the resource identifier is, for example, "http://www.sony.co.jp/keitail.html".

HTML documents are stored in the URL unique to the portable information terminal 50, and in practice, the URL indicates redirection to another URL (<meta HTTP-EQUIV="Refresh"URL="">).

Redirect is a download procedure for rewriting a resource identifier, for example, a URL, in a server and for returning a target URL. In this example, redirect is implemented by inserting meta-tag into the <HEAD> tag of the HTML file. Alternatively, redirect can be implemented by using CGI (Common Gateway Interface) or script.

The TV receiver also has a WWW (World Wide Web) page indicating the operation information for remotely controlling the receiver. It is now assumed that such a URL is "http://tv.home.net/sousa.html". The machine-operating WWW page is centrally managed by, for example, the machine manufacturer.

Upon obtaining the ID information, the TV receiver sends a request to the information providing server 30 (www.sony.co.jp) to redirect the information storage location (http://www.sony.co.jp/keitail.html) represented by the access method to the operation-information storage location (http://tv.home.net/sousa.html) of the TV receiver.

Figure 19:
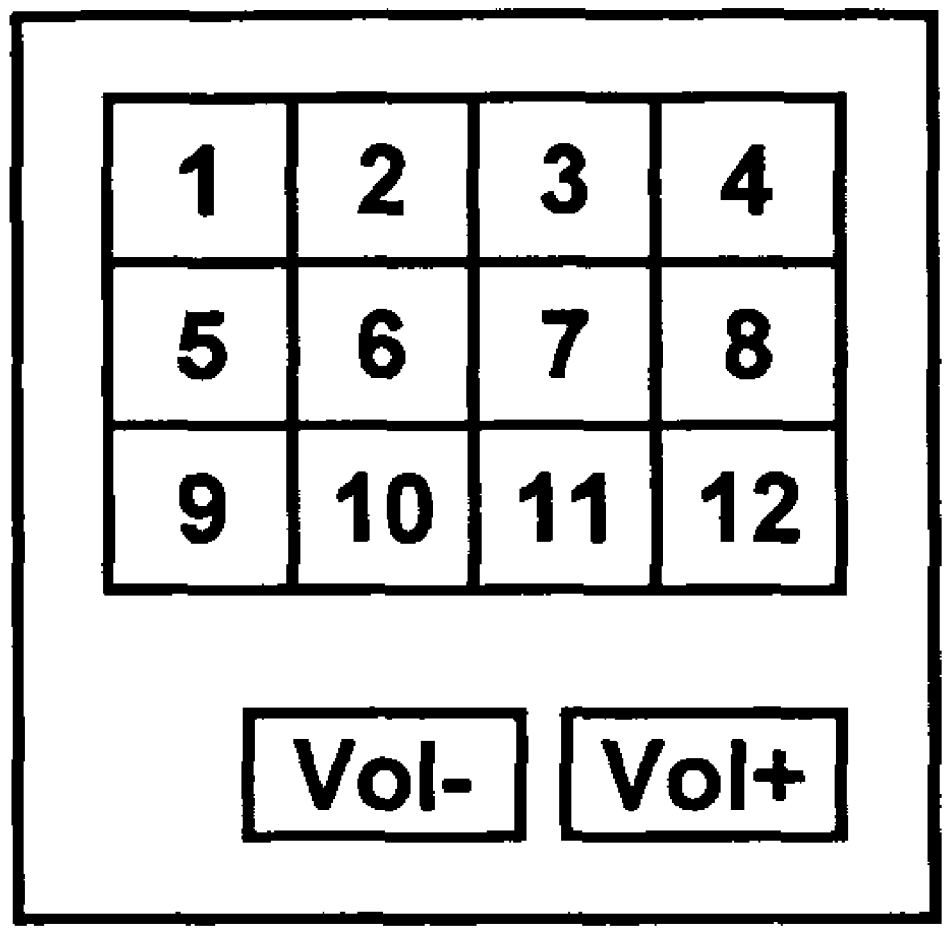
FIG. 19 illustrates an example of the configuration of an operation information page of a TV receiver.

Then, the portable information terminal 50 connects to the URL (in this example, http://www.sony.co.jp/keitail.html)

unique to the terminal. In practice, however, the portable information terminal 50 connects to the redirected location (http://tv.home.net/sousa.html). As a result, the portable information terminal 50 can view the operation information page (see FIG. 19) of the TV receiver so that it can remotely control the TV receiver by operating the anchor through this operation information page.

The operation information of the TV receiver made available in the WWW page (http://tv.home.net/sousa.html) is written by using, for example, Java Applet, and can be downloaded and executed by the portable information terminal 50. Accordingly, it is not necessary to distribute or install the operation information to or in the portable information terminal 50 in advance.

Figure 20:
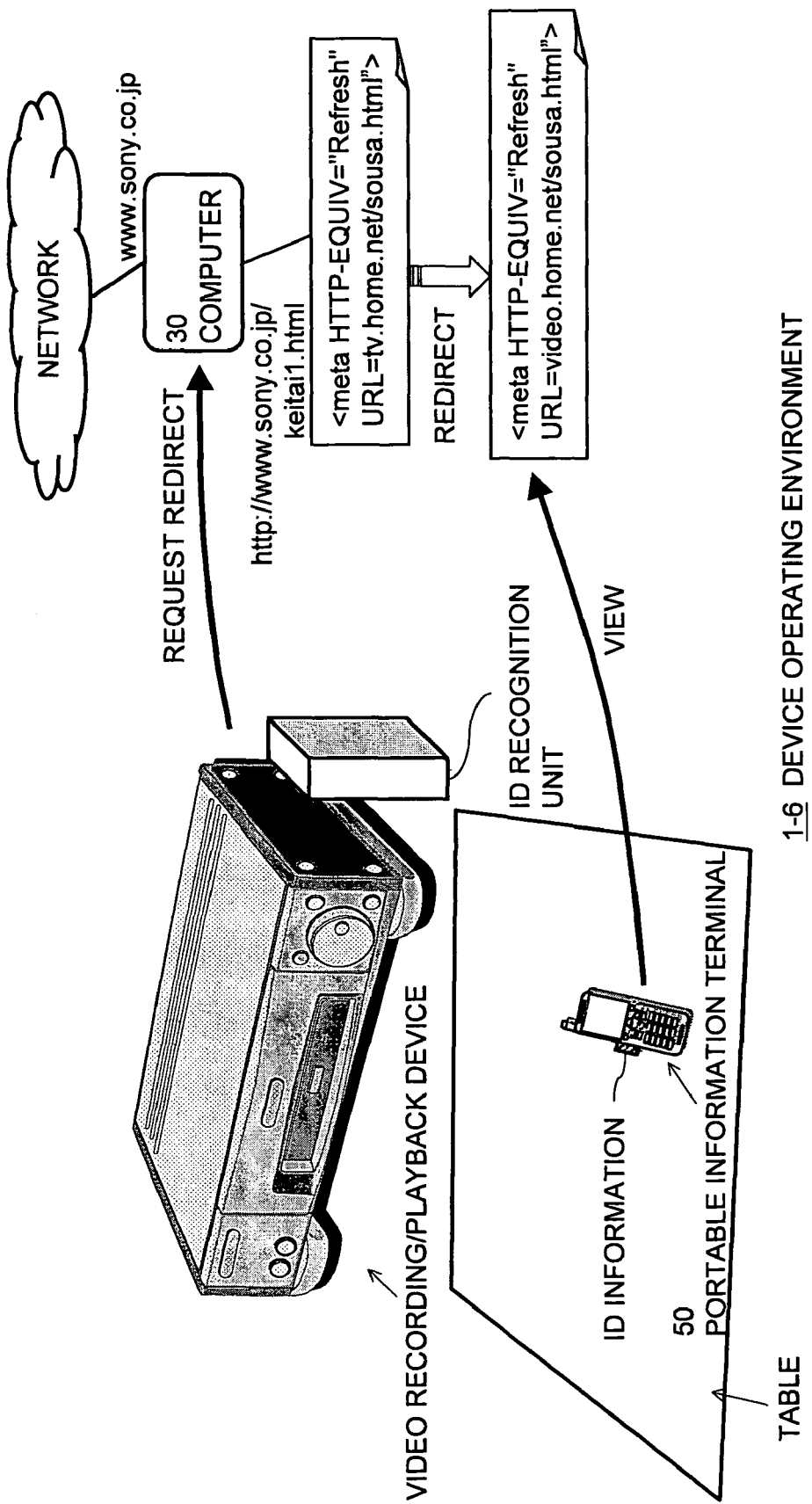
FIG. 20 illustrates a modification to the device operating environment 1-6 shown in FIG. 18.

The ID information of the portable information terminal 50 can also be identified by another device (for example, a video recording/playback device) (see FIG. 20). It is now assumed that the video recording/playback device also possesses a unique WWW page (http://video.home.net/sousa.html).

The video recording/playback device sends a request to the information providing server 30 (www.sony.co.jp) to redirect the identified ID (http://www.sony.co.jp/keitail.html) to the WWW page (http://video.home.net/sousa.html) unique to the video recording/playback device.

Figure 21:
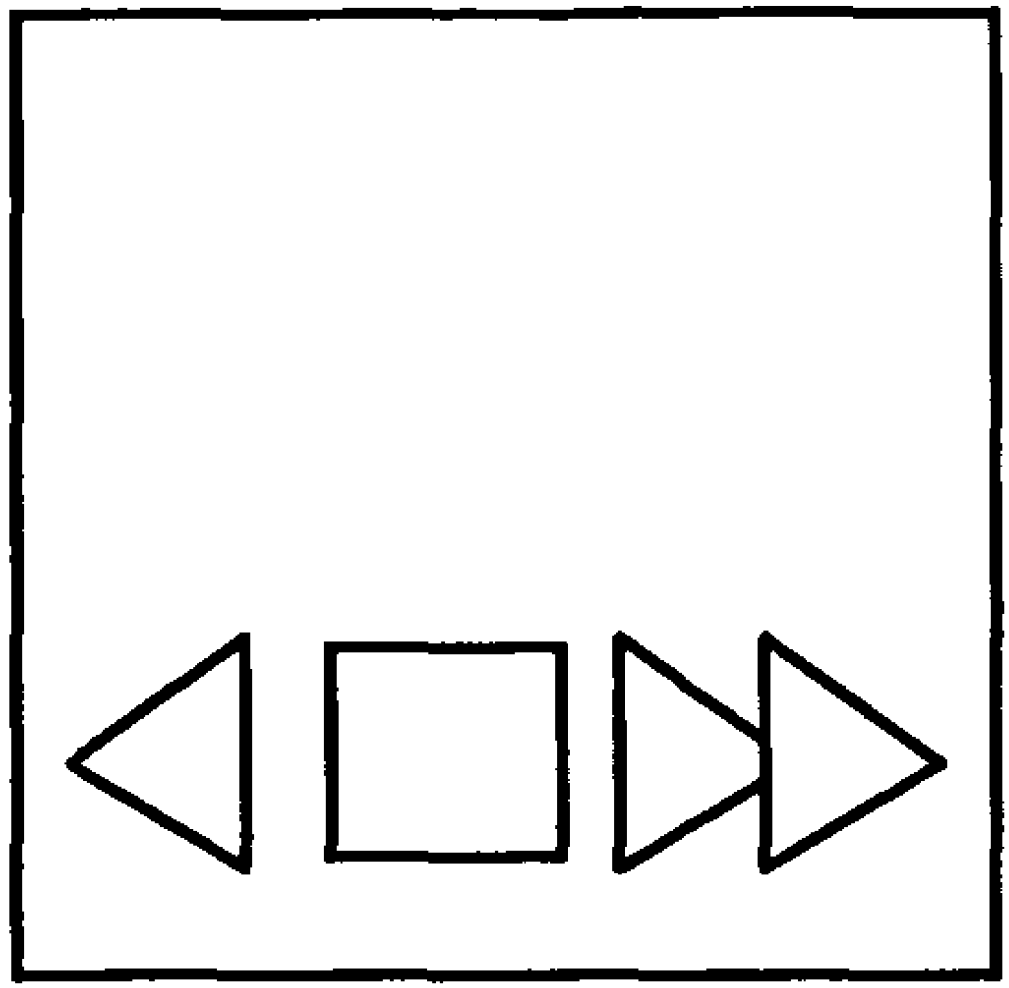
FIG. 21 illustrates an example of an operation information page of a video recording/playback device.

Then, when the portable information terminal 50 connects to the unique URL (in this example, http://www.sony.co.jp/keitail.html), it connects to the redirected URL http://video.home.net/sousa.html. As a result, the portable information terminal 50 can view the operation information page (see FIG. 21) of the video recording/playback device so that it can remotely control the video recording/playback device by operating the anchor through this operation information page. The operation information is written by using, for example, Java Applet, and can be downloaded and executed by the portable information terminal 50. Accordingly, it is not necessary to distribute or install the operation information to or in the portable information terminal 50 in advance.

As is seen from the above description, the portable information terminal 50 is able to connect to the URL (http://www.sony.co.jp/keitail.html) unique to the terminal by performing a simple operation (for example, pressing a specific button such as "start Web browser"). As a result, the user of the portable information terminal 50 is able to connect to the WWW page indicating the operation information by a simple operation such as "identify ID" without the need to manually input the WWW address of each device to be operated. The remote control operation on the devices can be performed based on the anchor operation on the browser screen.

In this embodiment, apart from the means for connecting to the WWW (network interface or Web browser), it is only necessary that an ID tag be attached to the portable information terminal 50. That is, to implement the above-described operation, it is only necessary to attach an ID tag to known hardware, for example, a cellular telephone.

Figure 22:
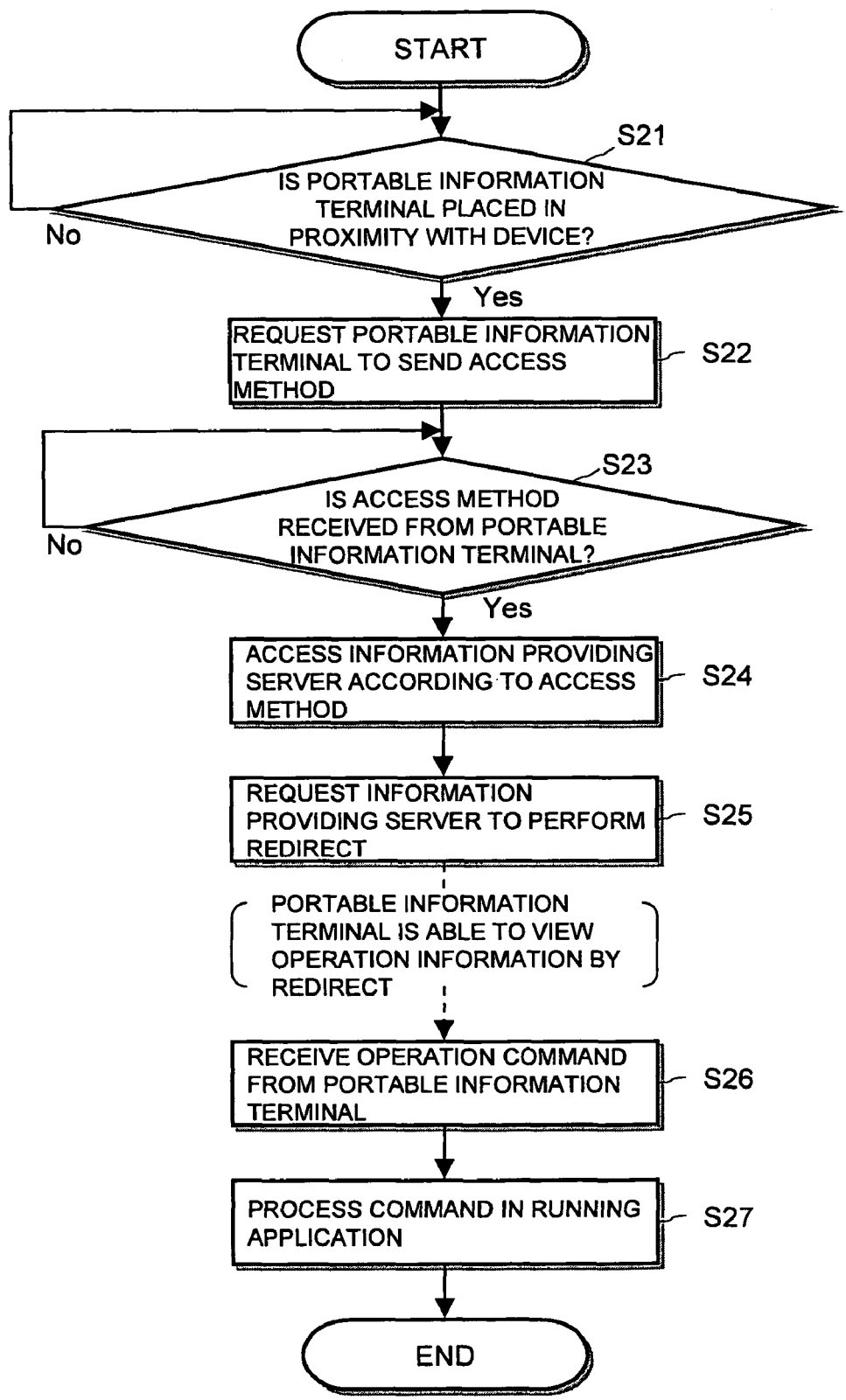
FIG. 22 is a flowchart illustrating the operation performed by a device to be remotely operated in the device operating environment 1-6 according to a further embodiment of the present invention.

FIG. 22 is a flowchart illustrating the operation performed by a device to be remotely controlled under the device operating environment 1-6 according to this embodiment.

When the portable information terminal 50 owned by the user is placed in proximity with a device to be remotely controlled (step S21), the device requests the portable information terminal 50 to send a method for accessing the information storage location of the portable information terminal 50 (step S22).

The portable information terminal 50 possesses the access method indicated in a format, for example, a URL or URI, as the ID information. In practice, the transmission request of the access information is made by reading the ID information by the ID recognition unit 18. The ID recognition method is not particularly restricted, and a non-contact recognition method, for example, the above-described RF-ID, touch net, barcode, two-dimensional barcode, cybercode, or infrared communication, can be used.

Upon receiving the method for accessing the information storage location unique to the portable information terminal 50 by identifying the ID information 16 (step S23), the device accesses the predetermined information providing server 30 according to this access method (step S24).

The device to be remotely controlled makes the operation information of the device available on a network. The device requests this information providing server to redirect the information storage location indicated by the access method to the storage location storing the operation information content of the device (step S25). Redirect is implemented by, for example, meta-tag, CGI, or script (described above).

As a result, by connecting to the URL unique to the portable information terminal 50, the portable information terminal 50 is able to view the page in which the operation information of the remotely controlled device is made available. The user of the portable information terminal 50 is able to remotely control the device through this operation information page. The operation information is written by using, for example, Java Applet, and can be downloaded by the portable information terminal 50.

The information storage location assigned to the portable information terminal 50 is a private information space, and thus, it can be considered that the information indicating the method for accessing such an information storage location should be handled with high security.

Figure 23:
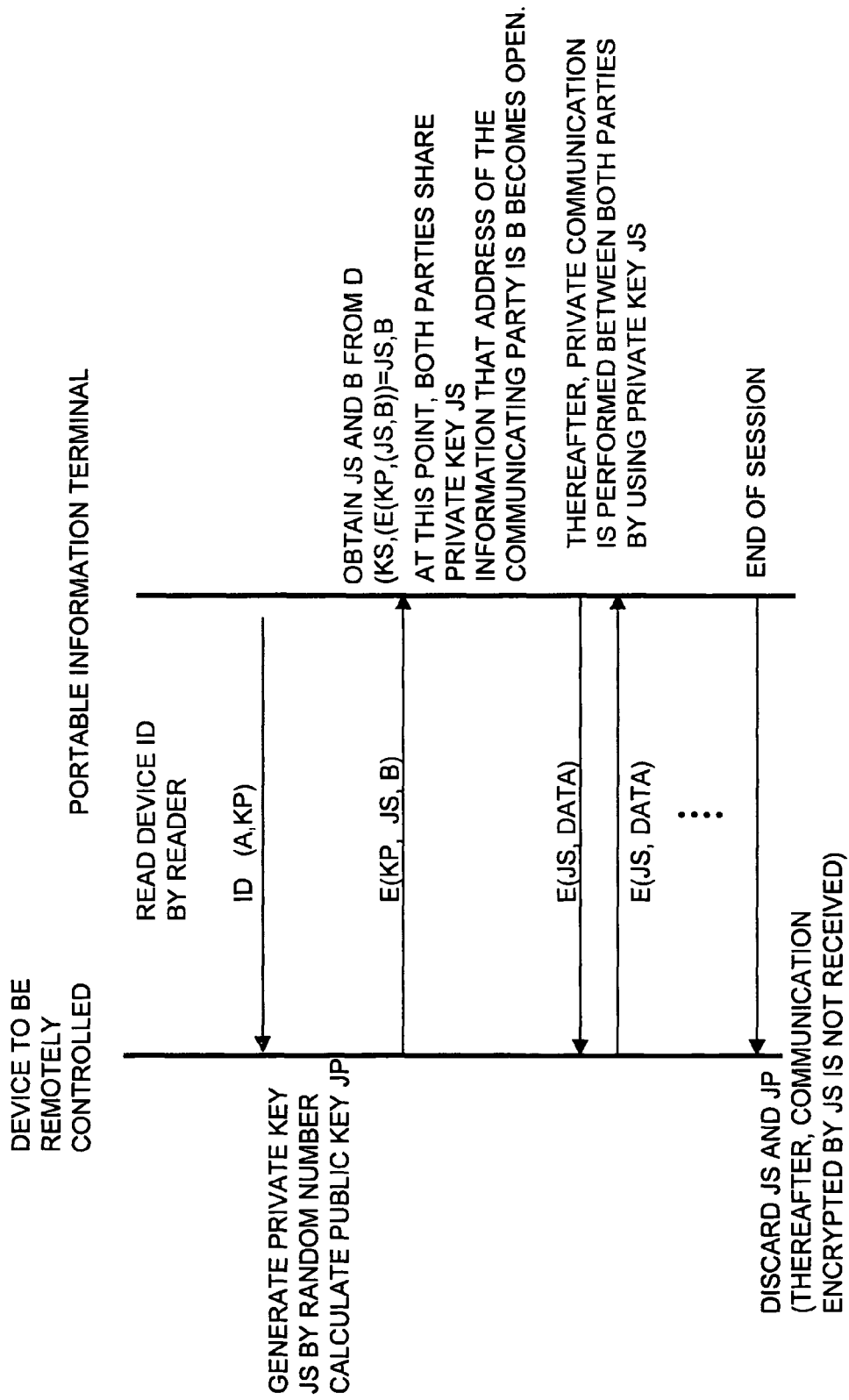
FIG. 23 is a sequence diagram illustrating a communication procedure for reading ID information by taking the security into consideration.

FIG. 23 illustrates a communication procedure for reading ID information by taking the security into consideration. This communication procedure is applicable to, for example, step S22 of the flowchart of FIG. 22.

In response to a request to send ID information from the remotely controlled device, the portable information terminal 50 sends ID information consisting of a set of address information A of the terminal and a public key AP of the terminal.

The ID information of such a format is open information. All the data flowing in the communication channel are also assumed as open information.

Meanwhile, the device generates a private key JS as a random number and generates a public key JP corresponding to the private key JS. Then, the device encrypts a set of the private key JS and address information B of the device with the public key KP of the terminal 50, and sends this ciphertext to the terminal 50.

The portable information terminal 50 decrypts the received ciphertext with a private key KS of the terminal 50 so as to obtain the private key JS and the address information B. At this point, both the portable information terminal 50 and the device share the same private key JS, and the portable information terminal 50 knows the address information B of the communicating party.

Thereafter, private communication can be performed between the portable information terminal 50 and the device by using JS as the private key. By using this private communication, the portable information terminal 50 is able to securely deliver private data, for example, a URL indicating the information storage location unique to the portable information terminal 50, to the communicating party. Then, the operation information of the device can be provided via this URL.

Upon completion of session after performing communication between both the communicating parties, the private key JS and the public key JP generated for private communication are discarded. Thereafter, communication encrypted by the private key JS should not be received because the possibility of such communication being unauthorized is very high.

Figure 24:
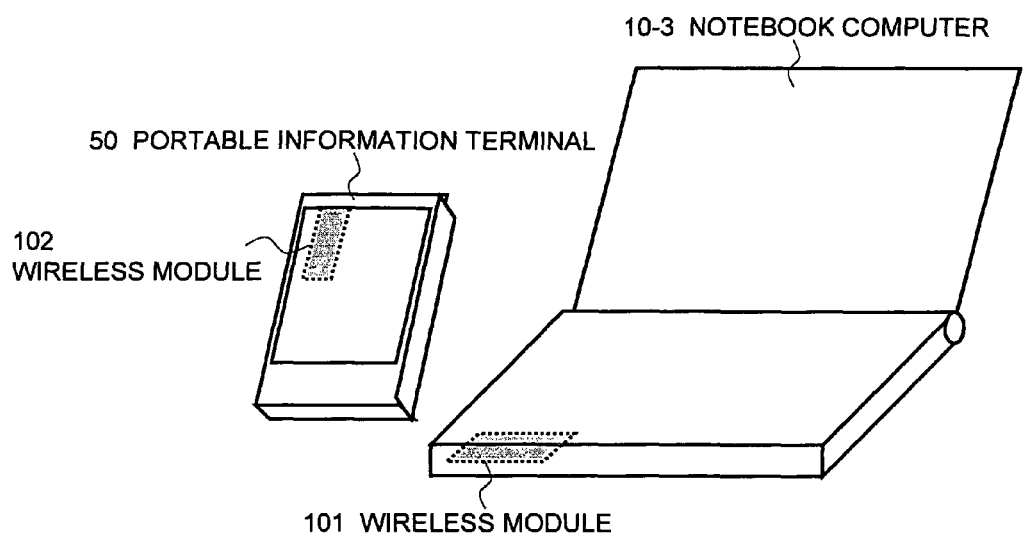
FIG. 24 illustrates a device operating environment 1-7 according to a further embodiment of the present invention.

FIG. 24 illustrates a device operating environment 1-7 according to a further embodiment of the present invention. As shown in FIG. 24, in this device operating environment 1-7, the information processing device 10-3, for example, a notebook computer, used by the user and the small portable information terminal 50, for example, a PDA, owned by the user are provided.

In the example shown in FIG. 24, modules 101 and 102 using short-distance wireless communication, for example, Bluetooth communication, are provided in the notebook computer 10-3 and the portable information terminal 50, respectively. In the above-described embodiments, an RF tag is used for storing and reading the ID information. In the embodiment shown in FIG. 24, however, the devices can be connected to each other by Bluetooth communication without using an RF tag. More specifically, in a first step, transmission power is decreased, and then, two devices are placed close to each other so as to specify the communicating devices, thereby establishing connection between the two devices. In a second step, after establishing connection, power is increased to the original level, and then, required information is sent. In a third step, the required information is obtained from a network so as to perform a remote control operation.

Figure 25:
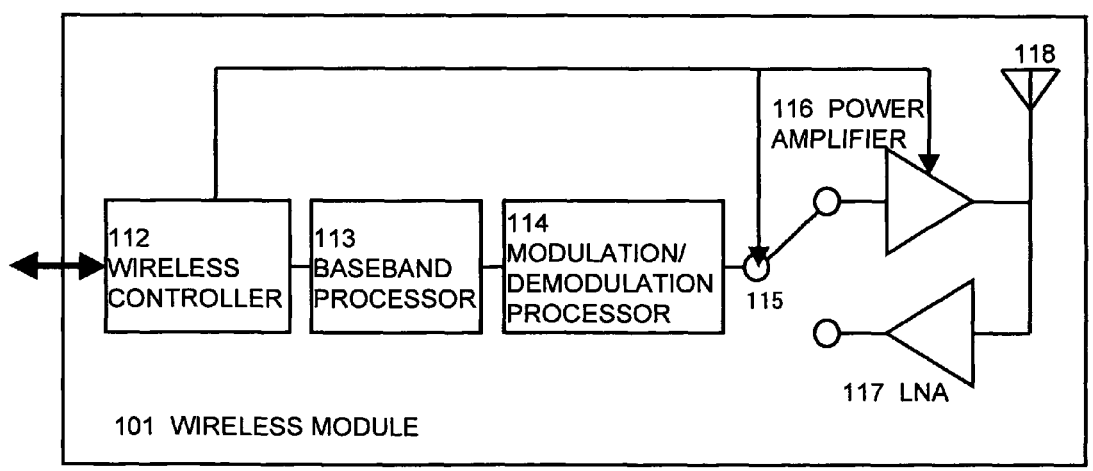
FIG. 25 schematically illustrates the functional configuration of a wireless module 101 (102) used for communication between devices in the device operating environment 1-7.

FIG. 25 schematically illustrates the functional configuration of the wireless module 101 (102) used for performing communication between the devices. As shown in FIG. 25, the wireless module includes a wireless controller 112, a baseband processor 113, a modulation/demodulation processor 114, a switch 115, a power amplifier 116, an LNA 117, and an antenna 118.

A transmission signal passes through the wireless controller 112, the baseband processor 113, and the modulation/demodulation processor 114, and is then transmitted via the power amplifier 116. The gain of the power amplifier 116 can be controlled by the wireless controller 112, and the transmission output can be controlled outside the wireless module 101 via the wireless controller 112. Instead of controlling the output by the power amplifier 116, the amplitude of the output signal may be changed in the baseband processor 113 or the modulation/demodulation processor 114.

In the example shown in FIG. 25, the radio-wave coverage distance can be changed by controlling the output power. As a result, the area within which communication can be made can be controlled. Thus, wireless communication can be performed by varying the communication area, for example, short-distance communication that restricts the communication area to be a short distance or relatively long-distance communication using the maximum output.

Figure 26:
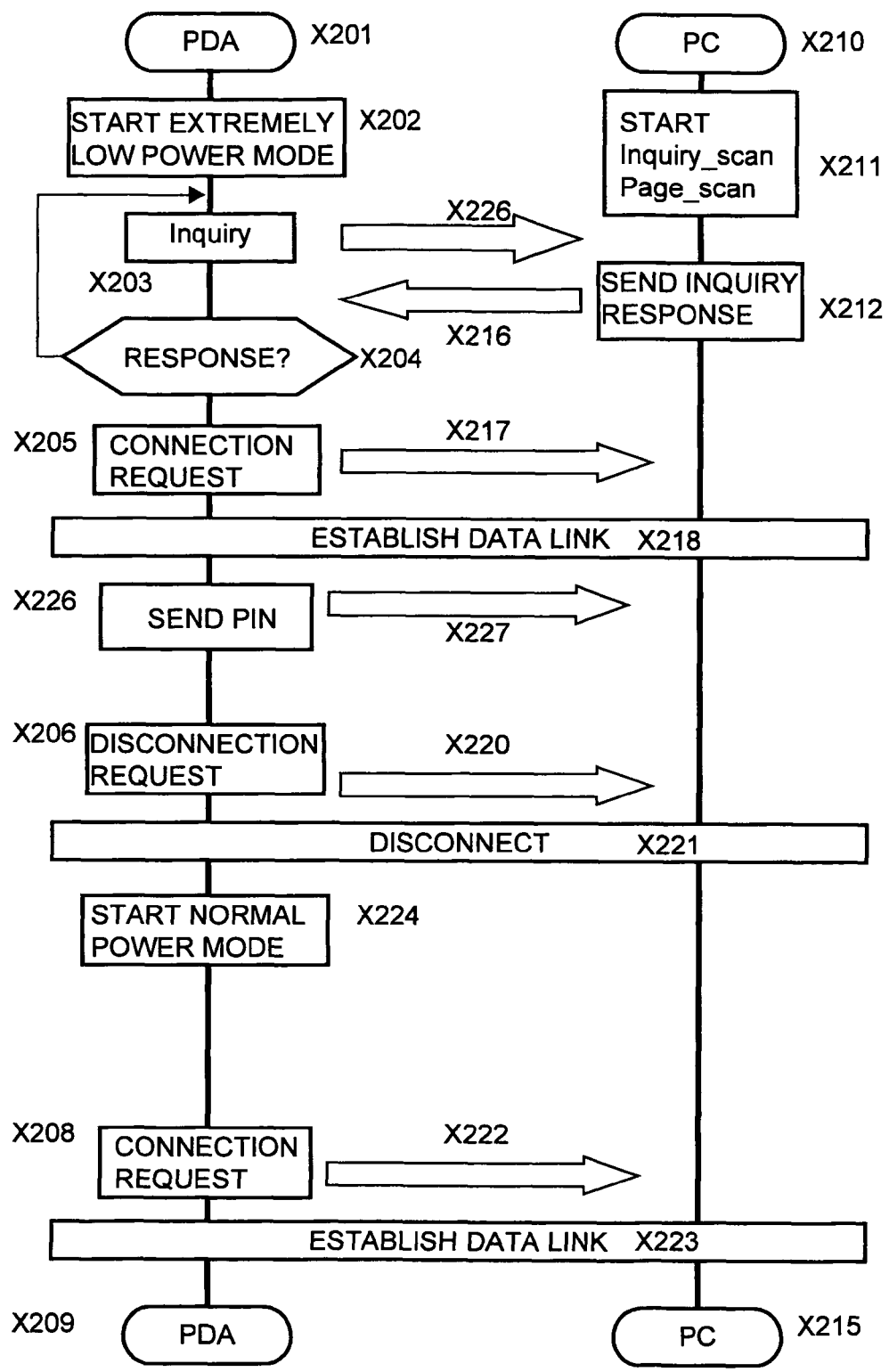
FIG. 26 is a sequence illustrating a communication procedure when a wireless communication function between devices is implemented by using Bluetooth communication in the device operating environment 1-7.

FIG. 26 illustrates a connection procedure sequence when a wireless communication function between the devices is implemented by using Bluetooth communication in the device operating environment 10-7 according to this embodiment.

A PDA (X201) periodically makes inquiries in an extremely low power mode X202 (X203), and a PC constantly performs inquiry scanning (X211).

Since the PDA makes inquires with an extremely low output, the radio waves do not reach the PC under normal conditions. If the distance between the PDA and the PC becomes shorter by the user or for some reasons, the PC detects an inquiry signal sent from the PDA, and returns a response signal, which is referred to as an "FHS packet" (X212, X216).

The FHS packet includes information required for making a connection request, for example, the Bluetooth device address of the PC (device address uniquely assigned to each Bluetooth module).

Upon receiving the FHS packet from the PC, the PDA makes a connection request by specifying the Bluetooth device address of the PC while outputting an extremely low output (X205, X217), and a data link is established between the PDA and the PC (X218).

Then, for ensuring the security, the PDA sends a character string, which is referred to as "PIN code", for device authentication, while maintaining the extremely low power mode (X226, X227).

To further ensure the security, the use of a public key cryptosystem can be considered, and more specifically, the PC, which is to receive the PIN code, may send a public key to the PDA, and the PDA encrypts the PIN code with the public key and then sends the encrypted PIN code to the PC.

The PDA disconnects the link (step X206, X220, X221). However, the subsequent procedure can be continued even if the link is not disconnected. It is not, therefore, essential that the link be disconnected. Thereafter, the PDA shifts from the extremely small power mode to the normal power mode (X224).

Supplement

The present invention has been described in detail with reference to what are presently considered to be the specific embodiments. However, it is apparent that various modifications and equivalent arrangements can be made on the embodiments by those who skilled in the art without departing from the spirit and scope of the appended claims. In short, the invention is disclosed by way of examples only, and should not be interpreted as restrictive. The scope of the invention is to be determined by the appended claims.

[Industrial Applicability]

According to the present invention, there can be provided a remote control system and a remote control method, a device for performing a remote control operation and a control method therefore, a device operable by remote control operation and a control method therefore, and a storage medium that exhibit excellent characteristics by allowing one device to control the operation of another device under a suitable operating environment.

According to the present invention, there is also provided a remote control system and a remote control method, a device for performing a remote control operation and a control method therefore, a device operable by remote control operation and a control method therefore, and a storage medium that exhibit excellent characteristics by performing a remote control operation under a suitable operating environment constructed by using operation information for allowing one device to perform a remote control operation on another device.

According to the present invention, there is also provided a remote control system and a remote control method, a device for performing a remote control operation and a control method therefore, a device operable by remote control operation and a control method therefore, and a storage medium that exhibit excellent characteristics by performing a remote control operation under a suitable operating environment by allowing one device to dynamically obtain operation information concerning another device.

The invention claimed is:

1. A remote control system that allows a first device to control an operation of a second device, comprising:
   ID information including a network address of a first information storage location and a first public security key associated with the first device;
   an ID recognition unit executing on a first processor, configured to obtain the network address and the first public security key from the first device by a first connection type in a low power mode;
   an encryption unit executing on a second processor associated with the second device, the encryption unit generating a second private key and a second public key corresponding to the second private key, and encrypting the second private key and a second information storage location with the first public key;
   a decryption unit executing on a third processor associated with the first device, the decryption unit decrypting the encrypted second private key and second information storage location using a first private key so as to obtain the second private key and the second information storage location;
   a network connection unit enabling a network connection between the first device and the second information storage location on the second device by linking the first information storage location with the second information storage location;
   an operation information providing unit executing on the second processor allowing a transfer of operation information from the second information storage location to the first device via the network connection, for remotely controlling the second device, wherein the operation information includes graphical user interface (GUI) information indicating an operation screen; and
   a remote control unit executing on the third processor allowing the first device to remotely control the second device by using the operation information via a second connection type, different from the first connection type and at an output power higher than an output power of the first connection type.

2. A remote control system that allows a first device to control an operation of a second device, comprising:
   ID information indicating a method for accessing a first information storage location and a first public security key provided for the first device;
   an ID recognition unit executing on a first processor for obtaining the method by reading the ID information and the first public security key from the first device by a first connection type in a low power mode;
   an encryption unit executing on a second processor associated with the second device, the encryption unit generating a second private key and a second public key corresponding to the second private key, and encrypting the second private key and a second information storage location with the first public key;
   a decryption unit executing on a third processor associated with the first device, the decryption unit decrypting the encrypted second private key and second information storage location using a first private key so as to obtain the second private key and the second information storage location;
   a network connection unit enabling a network connection between the first device and the second information storage location on the second device by linking the first information storage location with the second information storage location;
   an operation information providing unit executing on the second processor allowing a transfer of operation information for remotely controlling the second device via the second information storage location by using the obtained method, wherein the operation information includes graphical user interface (GUI) information indicating an operation screen; and
   a remote control unit executing on the third processor allowing the first device to remotely control the second device by using the operation information via a second connection type, different from the first connection type and at an output power higher than an output power of the first connection type.

3. A remote control system that allows a first device to control an operation of a second device, comprising:
   ID information indicating a method for accessing a first information storage location and a first public security key provided for the first device;
   an ID recognition unit executing on a first processor for obtaining the method by reading the ID information and the first public security key from the first device by a first connection type in a low power mode;
   an encryption unit executing on a second processor associated with the second device, the encryption unit generating a second private key and a second public key corresponding to the private key, and encrypting the second private key and a second information storage location with the first security public key;
   a decryption unit executing on a third processor associated with the first device, the decryption unit decrypting the encrypted second private key and second information storage location using a first private key so as to obtain the second private key and the second information storage location;
   a network connection unit enabling a network connection between the first device and the second information storage location on the second device by linking the first information storage location with the second information storage location;
   an operation information providing unit executing on the second processor providing a method for accessing the operation information for remotely controlling the second device via the second information storage location by using the obtained method, wherein the operation information includes graphical user interface (GUI) information indicating an operation screen; and
   a remote control unit executing on the third processor allowing the first device to remotely control the second device by using the operation information via a second connection type, different from the first connection type and at an output power higher than an output power of the first connection type.

4. A remote control system that allows a first device to control an operation of a second device, comprising:
   ID information indicating an access method of a first information storage location for exchanging information with the first device and a first public security key;
   an ID recognition unit executing on a first processor for reading the ID information and the first public security key from the first device by a first connection type, the first connection type being any one of formats including an RF-ID, touch net, a barcode, a two-dimensional barcode, a cybercode, infrared communication, and Bluetooth communication in a low power mode;
   an encryption unit executing on a second processor associated with the second device, the encryption unit generating a second private key and a second public key corresponding to the private key, and encrypting the second private key and a second information storage location with the first public key;

a decryption unit executing on a third processor associated with the first device, the decryption unit decrypting the encrypted second private key and second information storage location using a first private key so as to obtain the second private key and the second information storage location;

a network connection unit enabling a network connection between the first device and the second information storage location on the second device by linking the first information storage location with the second information storage location;

an operation information providing unit executing on the second processor allowing a transfer of operation information from the second information storage location to the first device via the network connection, for remotely controlling the second device, wherein the operation information includes graphical user interface (GUI) information indicating an operation screen; and a remote control unit executing on the third processor allowing the first device to remotely control the second device by using the operation information via a second connection type, different from the first connection type and at an output power higher than an output power of the first connection type.

5. A remote control system that allows a first device to control an operation of a second device, comprising:

ID information indicating an access method of a first information storage location and a first public security key for exchanging information with the first device;

an ID recognition unit executing on a first processor for identifying the access method by reading the ID information and the first public security key from the first device by a first connection type in a low power mode;

an encryption unit executing on a second processor associated with the second device, the encryption unit generating a second private key and a second public key corresponding to the private key, and encrypting the second private key and a second information storage location with the first public key;

a decryption unit executing on a third processor associated with the first device, the decryption unit decrypting the encrypted second private key and second information storage location using a first private key so as to obtain the second private key and the second information storage location;

a network connection unit enabling a network connection between the first device and the second information storage location on the second device by linking the first information storage location with the second information storage location, wherein the network connection is according to at least one of a wireless or wired LAN (Local Area Network), Bluetooth communication, a telephone network, and the Internet;

an operation information providing unit executing on the second processor allowing a transfer of operation information from the second information storage location to the first device via the network connection, for remotely controlling the second device, wherein the operation information includes graphical user interface (GUI) information indicating an operation screen; and a remote control unit executing on the third processor allowing the first device to remotely control the second device by using the operation information via a second connection type, different from the first connection type.

6. A remote control system according to any one of claims 1, and 2 to 5, wherein the operation information further includes an operation method suitable for operating the second device by the first device.

7. A remote control system according to any one of claims 1, and 2 to 5, wherein the first device is a portable information terminal including a cellular telephone or a PDA (Personal Digital Assistant) of a user.

8. A remote control system according to any one of claims 1, and 2 to 5, wherein the second device is a relatively large device used in an environment in which the second device is installed, wherein the second device includes at least one of: a notebook computer, a desk-top computer, a liquid crystal projector, or a television receiver.

9. A remote control system according to any one of claims 1, and 2 to 5, wherein the ID information or the ID recognition unit is installed in a place which is associated with a function implemented by the second device to be remotely controlled by the first device.

10. A remote control system according to any one of claims 1, and 2 to 5, wherein the ID information or the ID recognition unit is provided in a peripheral device connected to the second device to be remotely controlled by the first device.

11. A remote control method that allows a first device connected to a network to control an operation of a second device, comprising:

reading ID information from the first device by a first connection type in a low power mode, the ID information including a network address of a first information storage location and a first public security key associated with the first device;

generating at the second device a second private key and a second public key corresponding to the second private key;

encrypting at the second device the second private key and a second information storage location with the first public key;

decrypting at the first device the encrypted second private key and the second information storage location using a first private key so as to obtain the second information storage location;

enabling a network connection between the first device and the second information storage location on the second device by linking the first information storage location with the second information storage location;

allowing a transfer of operation information from the second information storage location to the first device via the network connection, for remotely controlling the second device, wherein the operation information includes graphical user interface (GUI) information indicating an operation screen; and allowing the first device to remotely control the second device by using the operation information via a second connection type, different from the first connection type and at an output power higher than an output power of the first connection type.

12. A remote control method that allows a first device connected to a network to control an operation of a second device, comprising:

reading ID information from the first device by a first connection type in a low power mode, the ID information indicating a method for accessing a first information storage location and a first public security key provided for the first device;

generating at the second device a second private key and a second public key corresponding to the second private key;

encrypting at the second device the second private key and a second information storage location with the first public key;

decrypting at the first device the encrypted second private key and the second information storage location using a first private key so as to obtain the second information storage location;

enabling a network connection between the first device and the second information storage location on the second device by linking the first information storage location with the second information storage location;

allowing a transfer of operation information from the second information storage location to the first device via the network connection, for remotely controlling the second device, wherein the operation information includes graphical user interface (GUI) information indicating an operation screen; and allowing the first device to remotely control the second device by using the operation information via a second connection type, different from the first connection type and at an output power higher than an output power of the first connection type.

13. A remote control method that allows a first device connected to a network to control an operation of a second device, comprising:

reading ID information from the first device by a first connection type in a low power mode, the ID information indicating a method for accessing a first information storage location and a first public security key provided for the first device;

generating at the second device a second private key and a second public key corresponding to the second private key;

encrypting at the second device the second private key and a second information storage location with the first public key;

decrypting at the first device the encrypted second private key and the second information storage location using a first private key so as to obtain the second information storage location;

establishing a network connection between the first device and the second information storage location on the second device by linking the first information storage location with the second information storage location;

providing a method for accessing the operation information for remotely controlling the second device via the second information storage location by using the method obtained by reading the ID information, wherein the operation information includes graphical user interface (GUI) information indicating an operation screen; and allowing the first device to remotely control the second device by using the operation information via a second connection type, different from the first connection type and at an output power higher than an output power of the first connection type.

14. A remote control method that allows a first device connected to a network to control an operation of a second device, comprising:

reading ID information from the first device by a first connection type, the ID information indicating an access method of a first information storage location for exchanging information with the first device and a first public security key, the first connection type being any one of formats including an RF-ID, touch net, a barcode, a two-dimensional barcode, a cybercode, infrared communication, and Bluetooth communication in a low power mode;

generating at the second device a second private key and a second public key corresponding to the second private key;

encrypting at the second device the second private key and a second information storage location with the first public key;

decrypting at the first device the encrypted second private key and the second information storage location using a first private key so as to obtain the second information storage location;

enabling a network connection between the first device and the second information storage location on the second device by linking the first information storage location with the second information storage location;

allowing a transfer of operation information from the second information storage location to the first device via the network connection, for remotely controlling the second device, wherein the operation information includes graphical user interface (GUI) information indicating an operation screen; and allowing the first device to remotely control the second device by using the operation information via a second connection type, different from the first connection type and at an output power higher than an output power of the first connection type.

15. A remote control method that allows a first device connected to a network to control an operation of a second device, comprising:

reading ID information from the first device by a first connection type in a low power mode, the ID information indicating an access method of a first information storage location for exchanging information with the first device and a first public security key;

generating at the second device a second private key and a second public key corresponding to the second private key;

encrypting at the second device the second private key and a second information storage location with the first public key;

decrypting at the first device the encrypted second private key and the second information storage location using a first private key so as to obtain the second information storage location;

enabling a network connection between the first device and the second information storage location on the second device by linking the first information storage location with the second information storage location, wherein the network connection is according to at least one of a wireless or wired LAN (Local Area Network), Bluetooth communication, a telephone network, and the Internet;

allowing a transfer of operation information from the second information storage location to the first device via the network connection, for remotely controlling the second device, wherein the operation information includes graphical user interface (GUI) information indicating an operation screen; and allowing the first device to remotely control the second device by using the operation information via the second connection type, different from the first connection type and at an output power higher than an output power of the first connection type.

16. A remote control method according to any one of claims 11, and 12 to 15, wherein the operation information includes an operation method suitable for operating the second device by the first device.

17. A remote control method according to any one of claims 11, and 12 to 15, wherein the first device is a portable information terminal including a cellular telephone or a PDA (Personal Digital Assistant) of a user.

18. A remote control method according to any one of claims 11, and 12 to 15, wherein the second device is a relatively large device used in an environment in which the second device is installed, wherein the second device includes at least one of: a notebook computer, a desk-top computer, a liquid crystal projector, or a television receiver.

19. A remote control method according to any one of claims 11, and 12 to 15, wherein the ID information is provided in a place which is associated with a function implemented by the second device to be remotely controlled by the first device.

20. A remote control method according to any one of claims 11, and 12 to 15, wherein the ID information is provided in a peripheral device connected to the second device to be remotely controlled by the first device.

21. A device for remotely controlling a first device, the first device generating a first private key and a first public key corresponding to the private key and encrypting the first private key and a first information storage location with the second public key received from the device, the device comprising:
    ID information stored on computer memory including a network address of a second information storage location associated with the device and a second public key;
    a communication unit sending the ID information to the first device by a first connection type in a low power mode;
    a decryption unit executing on a processor associated with the device for decrypting the encrypted first private key and first information storage location using a second private key so as to obtain the first private key and the first information storage location;
    a network connection unit establishing a network connection with the first information storage location associated with the first device, the second information storage location linked to the first information storage location;
    an operation information obtaining unit executing on the processor receiving operation information from the first information storage location via the network connection for remotely controlling the first device, wherein the operation information includes graphical user interface (GUI) information indicating an operation screen; and
    a remote control unit executing on the processor remotely controlling the first device using the obtained operation information via a second connection type, different from the first connection type and at an output power higher than an output power of the first connection type.

22. The device according to claim 21, wherein the operation information includes an operation method suitable for operating the first device by the device.

23. The device according to claim 21, wherein the device is a portable information terminal including a cellular telephone or a PDA (Personal Digital Assistant) of a user.

24. The device according to claim 21, wherein:
    the ID information includes a method for accessing the first information storage location and the second information storage location; and
    the operation information obtaining unit obtains the operation information, written into the second information storage location, for remotely controlling the first device.

25. The device according to claim 21, wherein:
    the ID information includes a method for accessing the first information storage location and the second information storage; and
    the operation information obtaining unit obtains the operation information for remotely controlling the first device by using the method written into the second information storage location.

26. The device according to claim 21, wherein the ID information is represented by any one of formats including RF-ID, touch net, barcode, two-dimensional barcode, cybercode, infrared communication and Bluetooth.

27. A control method for a device remotely controlling a first device, comprising:
    storing ID information including a network address of a first information storage location associated with the device and a first public key associated with the device;
    sending the ID information to the first device by a first connection type in a low power mode;
    generating at the first device a second private key and a second public key corresponding to the second private key
    encrypting at the first device the second private key and a second information storage location with the second public key, the second information storage location associated with the first device;
    decrypting at the device the encrypted second private key and second information storage location using a first private key so as to obtain the second private key and the second information storage location;
    establishing a network connection between the second information storage location and the first information storage location;
    receiving operation information, by a processor, from the second information storage location for remotely controlling the first device, wherein the operation information includes graphical user interface (GUI) information indicating an operation screen; and
    remotely controlling the first device by using the obtained operation information via a second connection type, different from the first connection type and at an output power higher than an output power of the first connection type.

28. A control method according to claim 27, wherein the operation information includes an operation method suitable for operating the first device by the device.

29. A control method according to claim 27, wherein the device which is connectable to a network is a portable information terminal including a cellular telephone or a PDA (Personal Digital Assistant) of a user.

30. A control method according to claim 27, wherein:
    the ID information includes a method for accessing the first information storage location and the second information storage location; and
    using the method for accessing the first information storage location and the second information storage location for remotely controlling the first device.

31. A control method according to claim 27, wherein the ID information is represented by any one of formats including an RF-ID, touch net, a barcode, a two-dimensional barcode, a cybercode, infrared communication, and Bluetooth communication.

* * * * *